US00RE43740E

(19) United States
(12) Reissued Patent
Karr

(10) Patent Number: US RE43,740 E
(45) Date of Reissued Patent: Oct. 16, 2012

(54) REVERSE LOCATOR

(75) Inventor: Lawrence J. Karr, Santa Monica, CA (US)

(73) Assignee: RoundTrip, LLC, Los Angeles, CA (US)

(21) Appl. No.: 13/204,033

(22) Filed: Aug. 5, 2011

Related U.S. Patent Documents

Reissue of:
(64) Patent No.: 7,573,381
Issued: Aug. 11, 2009
Appl. No.: 11/677,580
Filed: Feb. 21, 2007

U.S. Applications:
(60) Provisional application No. 60/775,291, filed on Feb. 21, 2006.

(51) Int. Cl.
*G08B 1/08* (2006.01)

(52) U.S. Cl. ..... 340/539.13; 340/426.17; 340/932.2; 340/988; 455/456.1

(58) Field of Classification Search .. 340/539.1–539.32, 340/568.1–572.1, 426.13–426.22, 425.5, 340/988, 457, 989, 932.2; 455/456.1; 701/2, 701/207–213
See application file for complete search history.

(56) References Cited

U.S. PATENT DOCUMENTS 3,568,161 A 3/1971 Knickel
3,646,580 A 2/1972 Fuller et al.
3,662,267 A 5/1972 Reed
3,714,650 A 1/1973 Fuller et al.
3,839,717 A 10/1974 Paul
4,006,477 A 2/1977 Yost, Jr. et al.
4,047,171 A 9/1977 Fugit
4,156,873 A 5/1979 Moore
4,218,680 A 8/1980 Kennedy
4,468,656 A 8/1984 Clifford et al.
4,475,106 A 10/1984 Andrews
4,608,022 A 8/1986 Bellofatto
4,611,198 A 9/1986 Levinson et al.
4,675,656 A 6/1987 Narcisse
4,797,948 A 1/1989 Milliorn et al.
4,862,176 A 8/1989 Voles
4,897,642 A 1/1990 DiLullo et al.
4,918,425 A 4/1990 Greenberg et al.
4,952,913 A 8/1990 Pauley et al.
4,954,835 A 9/1990 Lanciaux
5,045,839 A 9/1991 Ellis et al.
5,075,694 A 12/1991 Donnangelo et al.
5,126,733 A 6/1992 Sagers et al.
5,199,044 A 3/1993 Takeuchi et al.
5,278,563 A 1/1994 Spiess
(Continued)

*Primary Examiner* — Brent Swarthout
(74) *Attorney, Agent, or Firm* — Wong, Cabello, Lutsch, Rutherford & Brucculeri, LLP

(57) ABSTRACT

A remote locator (RL) continuously transmits multi-frame pings in a slow ping mode. The user activates a transponder/micro-transponder (MT) to receive at least a portion of the multi-frame ping and transmits a reply to the RL. The RL calculates a distance between the RL and the MT using the time-of-flight between the transmission of the ping and the receipt of the corresponding reply. The RL continues to send pings to the MT, where the ping includes distance measurements encoded therein. The user initiates sending a message from the MT to the RL to change to a fast ping mode, where the RL transmits pings at an increased rate. The MT includes a compass to capture readings while receiving and replying to pings. The MT determines a directional location for the RL with the collected measurements and received information and can provide a distance and directional readout to the user.

39 Claims, 23 Drawing Sheets

U.S. PATENT DOCUMENTS 5,280,293 A 1/1994 Tong
5,396,218 A 3/1995 Olah
5,418,537 A 5/1995 Bird
5,448,248 A 9/1995 Anttila
5,493,286 A 2/1996 Grube et al.
5,515,062 A 5/1996 Maine et al.
5,515,419 A 5/1996 Sheffer
5,572,427 A 11/1996 Link et al.
5,574,467 A 11/1996 Saunders
5,576,716 A 11/1996 Sadler
5,613,193 A 3/1997 Ishikawa et al.
5,632,217 A 5/1997 Ford et al.
5,905,464 A 5/1999 Lanciaux
5,943,013 A 8/1999 Ohashi
5,959,568 A 9/1999 Woolley
6,054,936 A 4/2000 Yamagata et al.
6,141,293 A 10/2000 Amorai-Moriya
6,150,921 A 11/2000 Werb
6,177,907 B1 1/2001 Golovin et al.
6,239,815 B1 5/2001 Frink et al.
6,243,025 B1 6/2001 Yamagata et al.
6,268,829 B1 7/2001 Weckstrom
6,317,049 B1 11/2001 Toubia et al.
6,337,665 B1 1/2002 Gaukel
6,362,778 B2 3/2002 Neher
6,437,742 B1 8/2002 Niesen et al.
6,466,162 B2 10/2002 Boman
6,529,142 B2 3/2003 Yeh et al.
6,608,592 B2 8/2003 McReynolds
6,611,757 B2 8/2003 Brodie
6,646,617 B1 11/2003 Gaukel
6,650,999 B1 11/2003 Brust et al.
6,778,130 B1 8/2004 Bevan et al.
6,801,782 B2 10/2004 McCrady et al.
6,826,472 B1 11/2004 Kamei et al.
6,838,987 B1 1/2005 Quinonez
6,876,878 B2 4/2005 Zhdanov
6,914,559 B2 7/2005 Marks
7,148,802 B2 12/2006 Abbruscato
7,253,717 B2 8/2007 Armstrong et al.
7,369,061 B1 5/2008 Sellers et al.
7,592,918 B2 9/2009 Karr
2002/0063622 A1 5/2002 Armstrong et al.
2002/0175805 A9 11/2002 Armstrong et al.
2002/0175820 A1 11/2002 Oja et al.
2004/0036597 A1 2/2004 Mays et al.
2005/0012653 A1 1/2005 Heide et al.
2005/0200521 A1 9/2005 Rodriguez
2005/0228659 A1 10/2005 Mitlin
2006/0001527 A1 1/2006 Dvorak et al.
2006/0038676 A1 2/2006 Richards
2006/0044181 A1 3/2006 Wilcox
2006/0250255 A1 11/2006 Flanagan
2008/0169904 A1 7/2008 Schulman et al.

REVERSE LOCATOR

Matter enclosed in heavy brackets [ ] appears in the original patent but forms no part of this reissue specification; matter printed in italics indicates the additions made by reissue.

RELATED APPLICATION

[This utility patent application claims the benefit under 35 United States Code § 119(e) of U.S. Provisional Patent Application No. 60/775,291, which was filed Feb. 21, 2006] *This is a reissue application of U.S. Pat. No. 7,573,381 (Ser. No. 11/677,580, filed Feb. 21, 2007, which claims the benefit under 35 U.S.C. §119(e) of U.S. Provisional Patent Application No. 60/775,291, filed Feb. 21, 2006.*

FIELD OF THE INVENTION

The present disclosure relates generally to a system and method for locating a remote locator device with a transponder. More particularly, the present disclosure relates to a transponder device that includes a compass sensor arranged to assist in locating a remote locator with the use of a spin-around procedure.

BACKGROUND

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

DETAILED DESCRIPTION

Figure 1A:
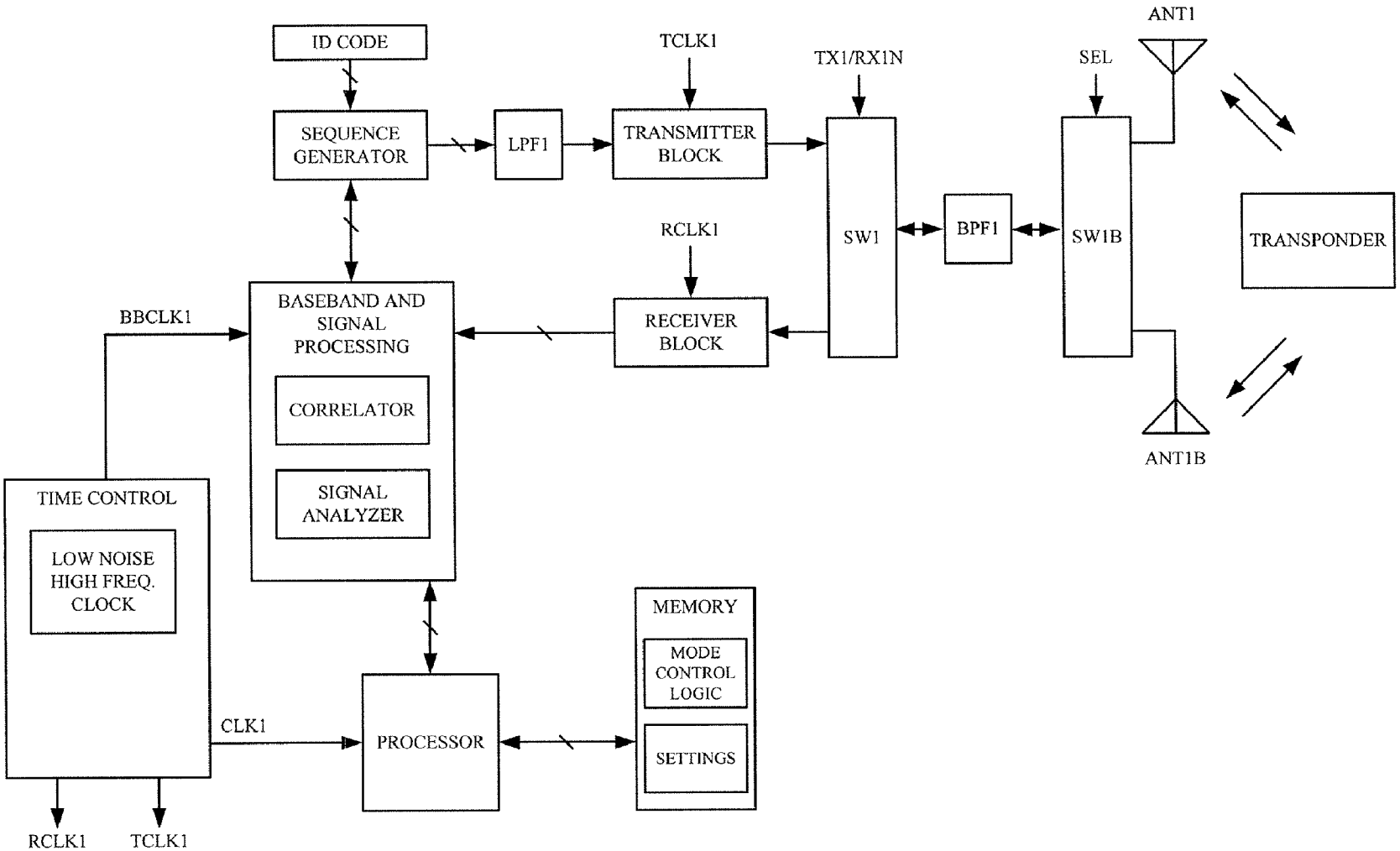
FIGS. 1A and 1B illustrate an example communication system that includes a remote locator (RL) and a micro-transponder (MT)

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure relates to a system, method, and apparatus for determining the location of a remote locator (RL) device with a hand-held transponder or micro-transponder (MT) device. The RL is arranged to transmit a multi-frame ping to the MT in a continuous slow ping mode. When active, the MT is arranged to receive the multi-frame ping, and transmit a reply message to the RL. The RL is arranged to receive the reply message and calculate a distance between the RL and the MT using the time-of-flight (TOF) between the transmission of a ping and the receipt of a reply. The RL also captures correlator phase information. The RL will continue to send a slow ping to the MT, where the ping includes the distance measurements encoded therein. The MT extracts the distance measurement and provides an indication to the user of the distance. The user can subsequently send an instruction from the MT to the RL so that the RL can enter a fast ping mode. In the fast ping mode the RL transmits the multi-frame ping more frequently than in the slow ping mode. The MT includes a compass device. During the fast ping mode, the user extends the MT device away from their body and turns through at least a partial arc length about their center line. The MT is arranged to capture compass readings while receiving and replying to the pings [form] *from* the RL. Each subsequent ping from the RL includes distance and correlation phase information. The MT subsequently determines a directional location for the RL with the collected measurements and received information and can provide a distance and directional readout to the user.

As will be described, the MT and the RL each include a receiver and a transmitter. The communication signals from the transmitters are encoded with a unique ID code. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The MT can be a wearable circuit such as a band or collar, affixed to an object, embedded in an object, or an implantable bionic device.

Frequency and phase information in the MT is initially recovered from one portion of the transmission from the RL, and further refined using a bootstrapping process. Timing location within the frame (e.g., coarse timing) is recovered in another portion of the transmission from the RL. After the timing, phase and frequency are recovered, data reception can be scheduled with a degree of certainty. The data is extracted and a reply message is transmitted from the MT back to the RL, where similar signal processing functions are performed. The carefully corrected round-trip time of the transmission sequence is used to identify distance between the RL and the MT. A synthetic round-trip Doppler shift, which is independent of the MT's internal clock, is measured to and correlated against the relative motion of the RL and MT to assess [identify] an appropriate direction for a directional vector between the RL and the MT. The magnitude of the directional vector is determined by the round-trip time.

The presently described system has the ability to identify location of a RL with a MT utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence. The MT is arranged to cyclically capture a complete pattern in the sequence, even though the captured pattern may not be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the RL is arranged to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate); either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

Example System

Figure 1B:
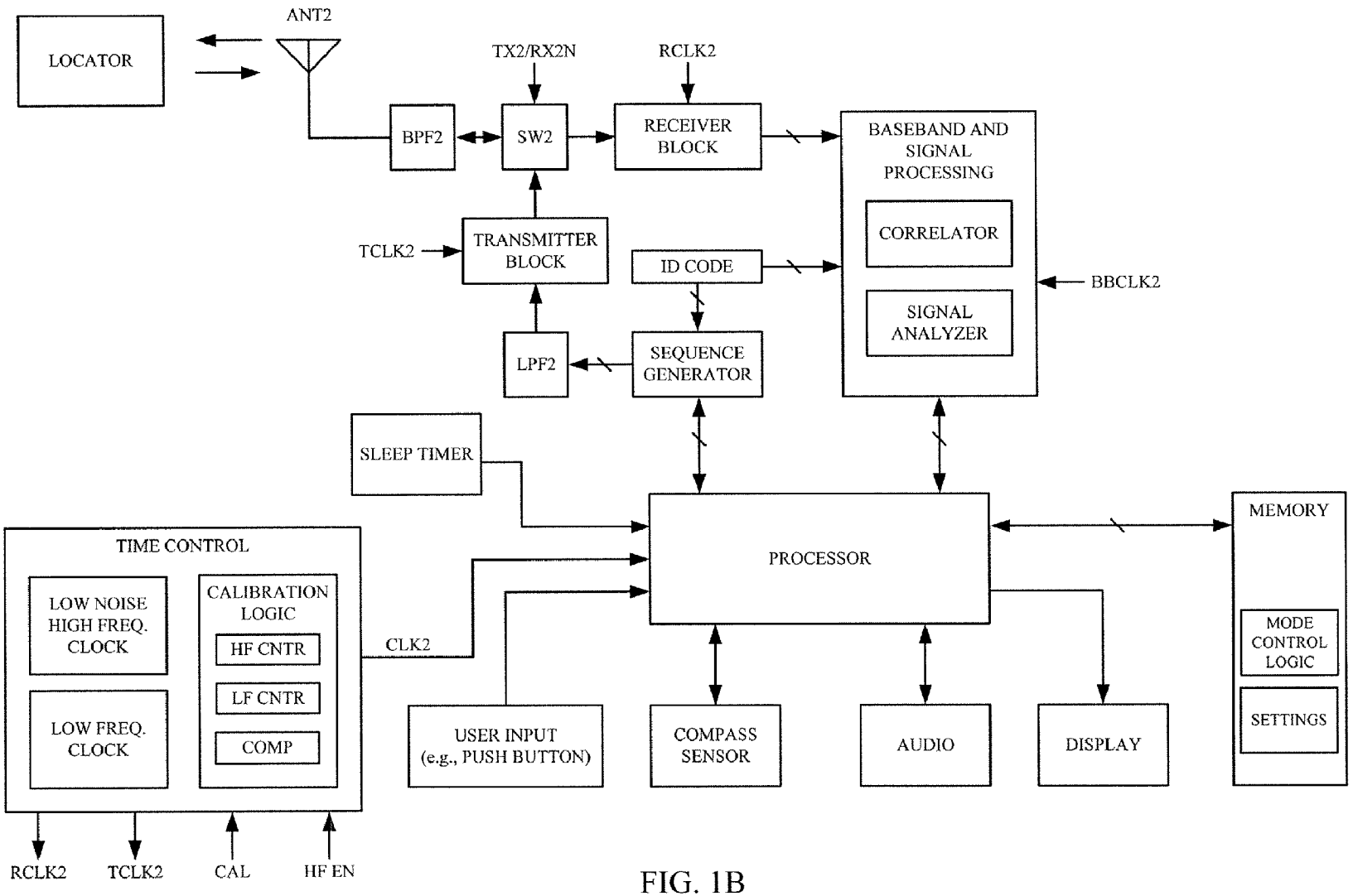

FIGS. 1A and 1B illustrate an example communication system that includes a RL and a MT arranged in according with at least one aspect of the present disclosure. The RL is arranged to transmit a sequence over a first communication channel, while the MT is arranged to transmit back to the RL over the communication channel in a half-duplex fashion.

The example RL device includes a first antenna (ANT1) that is coupled to a first transmit/receive switch (SW1). Another antenna (ANT1B) can optionally be coupled to the receiver block in some example systems through an additional switch (SW1B), where the second antenna is oriented orthogonal with respect to the first antenna. The selection of the antenna can be accomplished by a select control signal (SEL) that is arranged to operate the additional switch (SW1B) as a multiplexer between the various antennas. The antennas can be configured as diversity antennas so that additional information about signal strength, distance and Doppler can be obtained. The first transmit/receive switch (SW1) is coupled to a first transmitter block and a first receiver block in response to a first control signal (TX1/RX1N). A transmission sequence (e.g., TSEQ) is coupled to the first transmitter block when transmission commences, where the sequence is determined by an ID code. The first receiver block is coupled to the baseband and signal processing block. Time control is provided to the transmitter, receiver, baseband processing, and the processor in the form of various control signals (CLK1, RCLK1, TCLK1 and BBCLK1). The processor receives inputs and coordinates the operation of the baseband processing, signal analysis, memory buffering, input processing, display processing, and audio processing. The memory processing can include random access memory (RAM), read-only memory (ROM), as well as non-volatile memory (NVM) such as Flash memory, battery backed up RAM, EEPROM, as well as other NVM type technologies.

The example MT device includes a second antenna (ANT2) that is coupled to a second transmit/receive switch (SW2). The second transmit/receive switch (SW2) is coupled to a second transmitter block and a fourth receiver block in response to another control signal (TX2/RX2N). A reply sequence (e.g., RSEQ) is coupled to the second transmitter block when transmission commences, where the sequence is determined by the ID code. The second receiver block is arranged to provide in-phase and quadrature signals (I and Q) that are captured in a buffer (e.g. a memory buffer such as a digital buffer or an analog sample buffer). The capture buffer is coupled to a correlator in a baseband signal processor block, which can provide both direct form correlation and FFT correlation functions. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK2, RCLK2 and CLK2). The processor receives inputs and coordinates the operation of the correlator, signal analysis, sequence generation, memory buffering, and other related tasks. The memory for the processor can include random access memory (RAM), read-only memory (ROM), as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g., a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, the energy required to operate conventional cellular telephones even in a standby mode will rapidly deplete small batteries. In addition, a GPS set in such an application would awaken from sleep, and perform a cold start location fix, which process will consume a considerable amount of energy that again rapidly depletes the battery. The present disclosure contemplates that a portable location technology is preferably operated intermittently to minimize power consumption, and thus addresses some of the problems from conventional location determination techniques.

The present disclosure has analyzed and identified problems with current Doppler shift technology such as found in GPS signals. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Example Remote Locator (RL)

FIG. 1A illustrates an example RL that is arranged to communicate with an example MT. The MT is arranged (e.g., by a sleep timer or user initiated) to wake up at pre-determined intervals and receive a coded transmission signal (e.g., COM13). The coded signals are received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as [it's] *its* time base the Doppler shifted frequency of the signal from the RL, subsequently transmits a reply sequence back to the RL, which is similarly coded. The RL receives the coded transmission, and processes the incoming signals in a similar fashion as the MT.

The RL includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, a storage circuit, and a memory circuit.

The processor is arranged to apply mode control logic that is responsive to messages received from the MT, as well as its own internal mechanisms, for activating and deactivating a variety of operating modes as will be described. The mode control logic and any related settings for the RL can be provided in a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

The RL is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. In another example the encoded information is distance measurements. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) is arranged to couple the carrier modulated coded signals to the antenna (ANT1) during the transmit sequence. A band-limiting filter (e.g., BPF1) can be provided between the antenna and the transmit-receive switch (SW1) such that out-of-band signals are ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL is operated to receive a transmission from the MT that consists of another series of coded signals. The coded signal is similarly generated by the MT with a unique identifier (e.g., the ID Code) that is associated with the specific MT. The receiver block is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. The received signals are handled by a baseband processor that can also provide signal-processing functions. Alternatively, the baseband processor is arranged to provide captured signals to the processor, which is arranged to handle various signal-processing functions.

The described RL performs distance measurement by round trip time measurement. For example, the round trip time can be determined by the difference in time between the transmission of a signal from the MT to the RL, and the subsequent reply transmission of an acknowledgement signal from the RL back to the MT, offset by any other delays.

Various timing signals that are employed by the RL are generated by a time control circuit as illustrated in FIG. 1A. The timing signals are used by the system to digitally synthesize transmitter and receiver carrier wave signals from a locally generated oscillator signal in the RL.

Example Micro-Transponder (MT)

FIG. 1B illustrates an example MT that is arranged to communicate with a RL. The example MT may be placed in a wristband, a collar, a watch, sewn into an article of clothing, or implanted in a patient such as a with a bionic-type device. The MT is arranged to receive a coded transmission signal, such as previously described, from the RL with a receiver block via switch SW2 and antenna ANT2. Optionally, a band-limiting filter (e.g., BPF2) can be used to minimize interference from out-of-band signals in the receiver and/or to prevent interference with other devices. The receiver demodulates the carrier frequency and provides I and Q information, which is subsequently captured by a capture buffer. The capture buffer provides output signals in the form of data to an FFT correlator, which correlates the decoded transmission with the unique identifier (ID code).

The MT includes a processor that can be any appropriate processing means including but not limited to at least one: micro-processor, micro-controller, CISC processor, RISC processor, application specific integrated circuit (ASIC), to name a few. The processor is arranged to: receive and evaluate inputs from the user, control outputs, log data, retrieve logged data, and execute programs. The processor is thus arranged to communicate with any number of circuit components such as: a time control circuit, a use input circuit, a digital compass circuit, an audio circuit, a display circuit, a storage circuit, and a memory circuit.

The processor is arranged to apply mode control logic in response to a variety of user inputs for activating and deactivating a variety of operating modes as will be described. The mode control logic and any related settings for the MT can be provided in a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

Example inputs can be from any number of sources such as: an interrupt signal, a wake-up timer, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. [.] In some examples, sound can be used as an input to the MT via audio input processor such as an analog-to-digital converter (ADC) circuit or a coder-decoder (CODEC) circuit that includes analog-to-digital conversion means. A microphone can be built into the MT or externally coupled to the MT through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the MT. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor is arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the MT device, as well as to provide navigation and location information. Example display circuits can provide any appropriate video output such as, for example: an LED type display, an LCD type display, an active display, a passive display, a black and white display, a monochromatic display, and/or a color display. Other example display circuits can be discrete arrangements of LEDs, seven segment displays, as well as other light emitting devices that can be used for reporting visual information. In some examples, the user interface can be integrated with the video output device such as, for example, a touch screen that is integrated with an LCD display. In other examples, the user input interface is separate from the video output device.

The processor in the MT of the present disclosure is arranged to cooperate with a compass sensor device or some similar means for determining a rotational position of the MT device. The compass sensor can be an integrated circuit, a discrete circuit, or some other device that is arranged to provide compass sensor information that is related to a directional orientation of the MT. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and /or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change to slow ping mode, change to fast ping mode, etc.

It is important to note that the processor in the MT of the present disclosure is arranged to apply mode control logic in response to signals that are received from the RL. The mode control logic [an] *and* any related settings for the MT can be provided in any of the above described memory devices, or as hard-coded instructions in a micro-controller, to name a few. In another example, the processor and memory can be replaced with a PLD, a specially designed circuit such as an ASIC, as well as others devices that are arranged to provide similar functionality.

A reply message is transmitted from the MT to the RL such that the RL can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter block in the MT. The transmitter block is coupled to antenna ANT2 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer that operates from a low frequency clock. According to a pre-determined time interval, the MT is activated (e.g., wakeup is asserted by the sleep timer) and the MT looks for a signal to receive while operating a high frequency clock. When no identifiable signal can be received, the MT returns to the sleep mode, where the high frequency clock is disabled. The high frequency clock can be enabled and disabled by a respective control signal (e.g., HF EN). The MT can also be activated by the user such as by pressing a user input button.

[Bearing] *A bearing* to the RL is determined by the cooperative operation of the RL and MT as will be described later. In general, the user initiates a search mode by activating the MT. A communication link is established with the RL, and the MT receives an initial distance calculation from the RL. The user subsequently initiates *a* locate mode that requires at least a partial rotation of the MT through an arc relative to the user where additional distance measurements and correlator information are acquired by the RL. Information is communicated back to the MT such that the MT can determine the direction to the RL.

Various timing signals that are employed by the MT (or MT) are generated by a time control circuit as illustrated in FIG. 1B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic is enabled when a calibration signal (CAL) is asserted, such as in response to the processor when applying mode control logic.

The above described remote locator (RL) can be arranged to provide a relatively high power transmission signal (e.g., 1 Watt).

The transponder (MT) is arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

Example Transmitter

Figure 2:
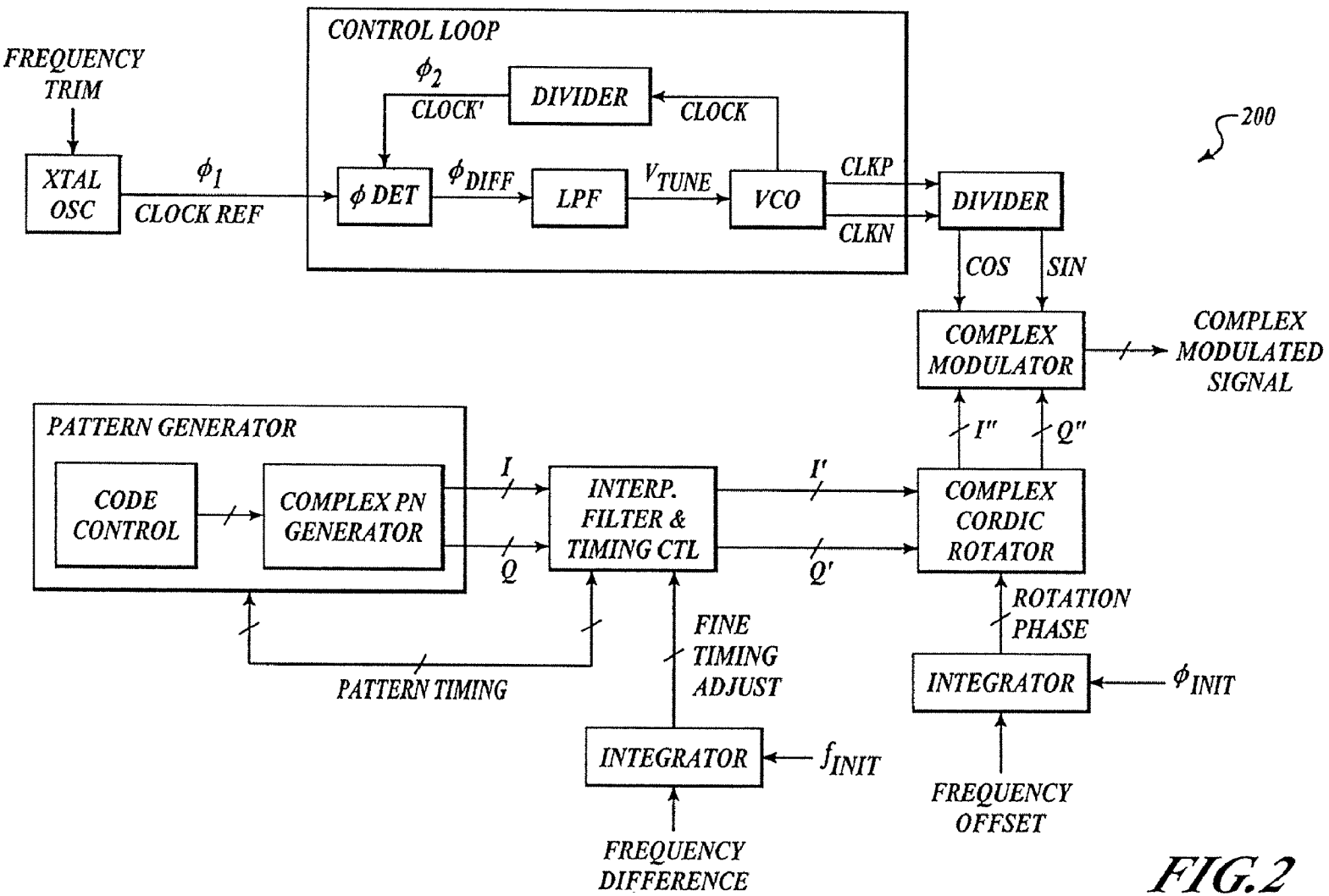
FIG. 2 illustrates an example transmitter.

FIG. 2 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase [(] ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 8192/2047), and provides low-pass filtering for the transmitter. The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 3:
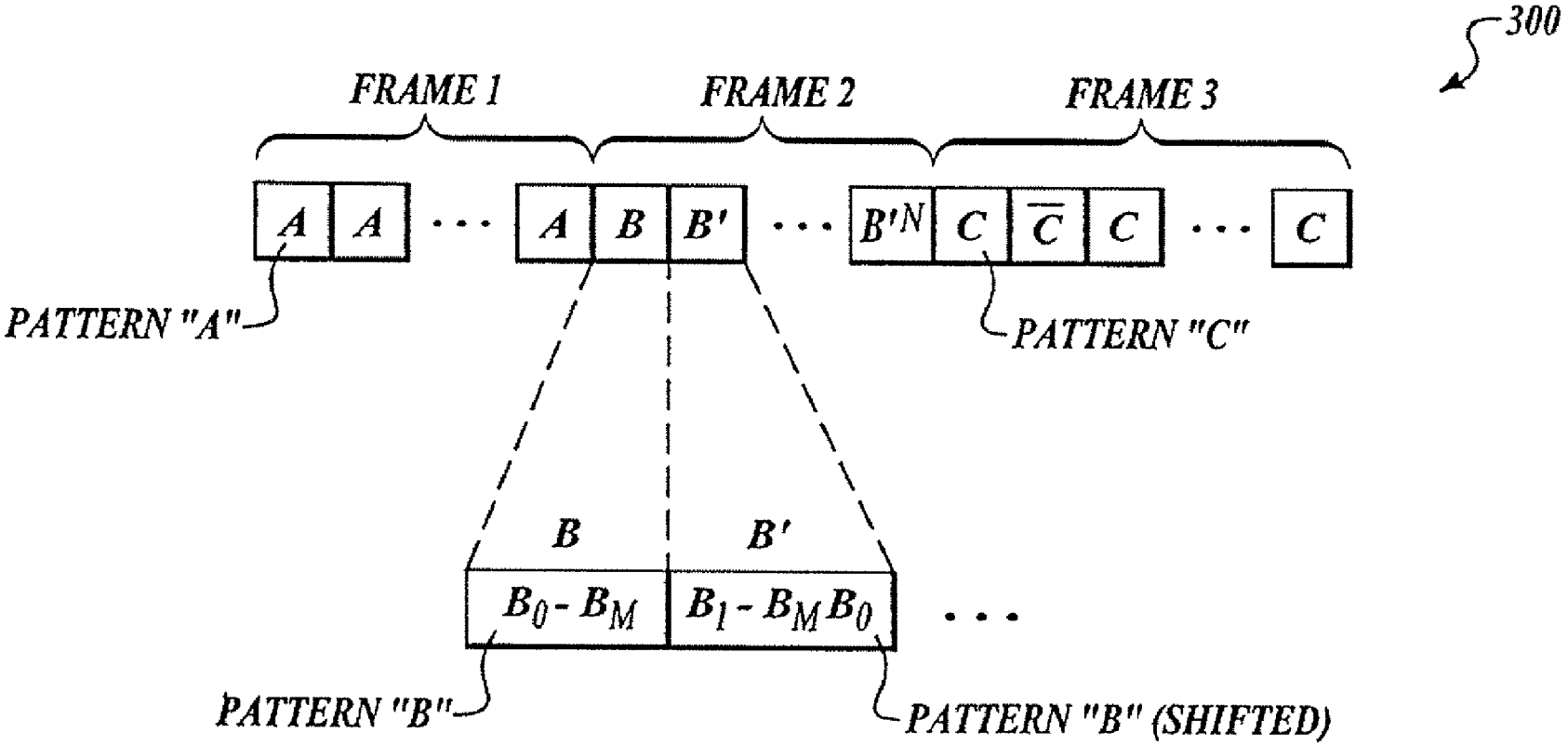
FIG. 3 is a diagram illustrating a set of frames formatted for transmission.

FIG. 3 is a diagram illustrating a set of frames formatted for transmission. A frame corresponds to a time-period for which a sequence is transmitted. For the example of FIG. 3, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission is referred to as a PING as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, . . . , BM, while the second B sequence (B') includes coded bauds B1, B2, . . . , BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.) or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

The MT transmits sequences A and B in substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information for a full non-hollowed transmission:

Received Frame consists of 4096 samples, 2047 baud;

Received Sample Rate is 25.777M complex samples/sec;

Transmitted Sample Rate is 2*25.777M complex samples/sec;

Baud Rate is determined by Sample Rate * (2047/2048)/2=12.8822 Mbaud symbols/sec, QPSK; and Frame Period is 158.98 μs.

An example system has the following RL TX parameters for a full non-hollowed transmission:

"A" sequence is 2.2263 seconds long, (13×1024 frames), repeated un-shifted with one of 2047 first address portions;

"B" sequence is 317.96 ms long (2000 frames), repeated shifted with one of 2047 second address portions; and "C" sequence is 10.174 ms long (64 frames), repeated un-shifted with one of 2047 third address portions, frames inverted according to modulated data.

An example system has the following MT TX parameters for a full non-hollowed transmission:

"A" sequence is 81.397 ms long, (512 frames);

"B" sequence is 20.349 ms long (128 frames); and

"C" sequence is 10.174 ms long (64 frames), repeated un-shifted with one of 2047 third address portions, frames inverted according to modulated data.

Example Timing Acquisition Sequence

Figure 4A:
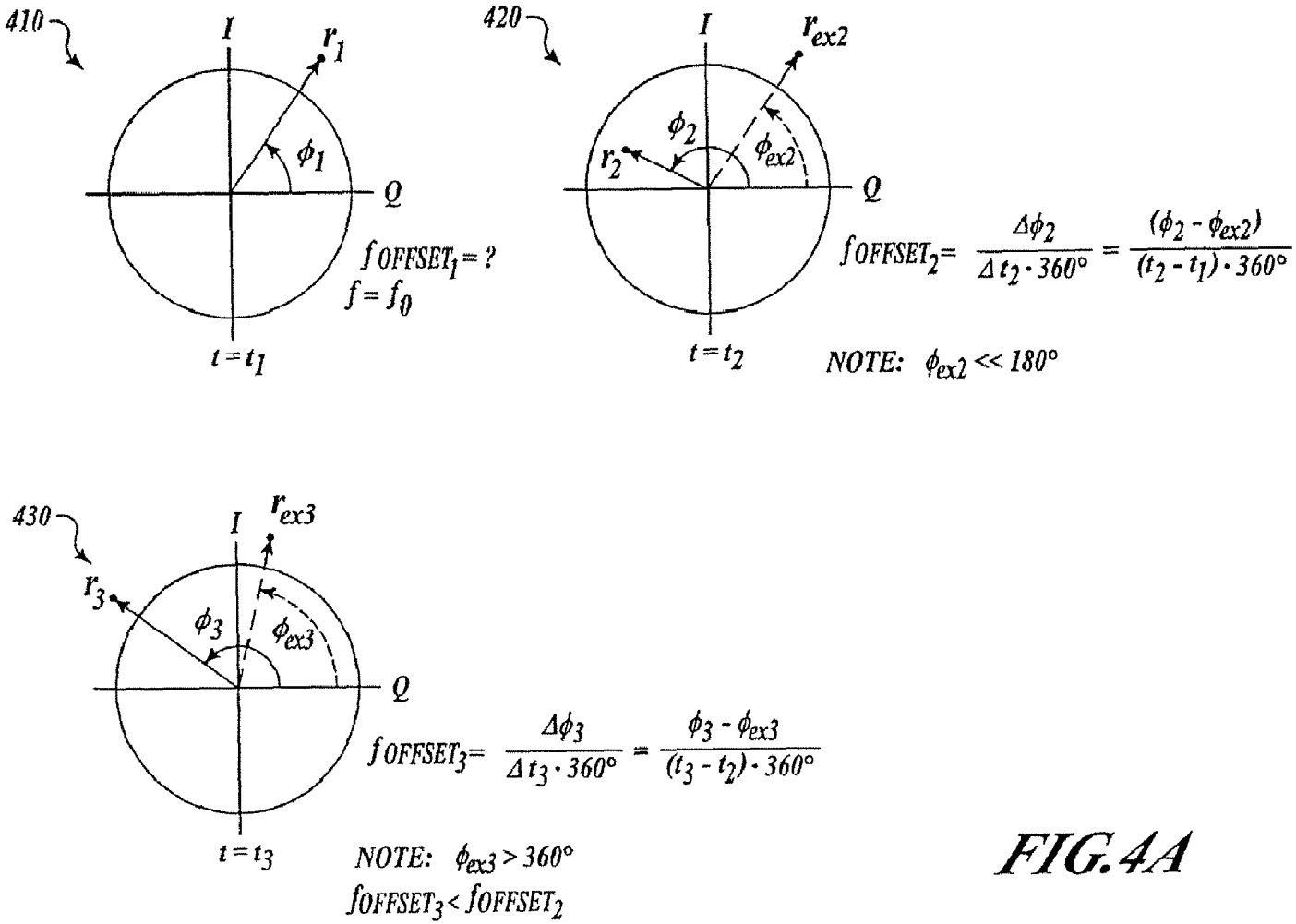
FIGS. 4A and 4B are diagrams illustrating the timing acquisition for an example communication system.
Figure 4B:
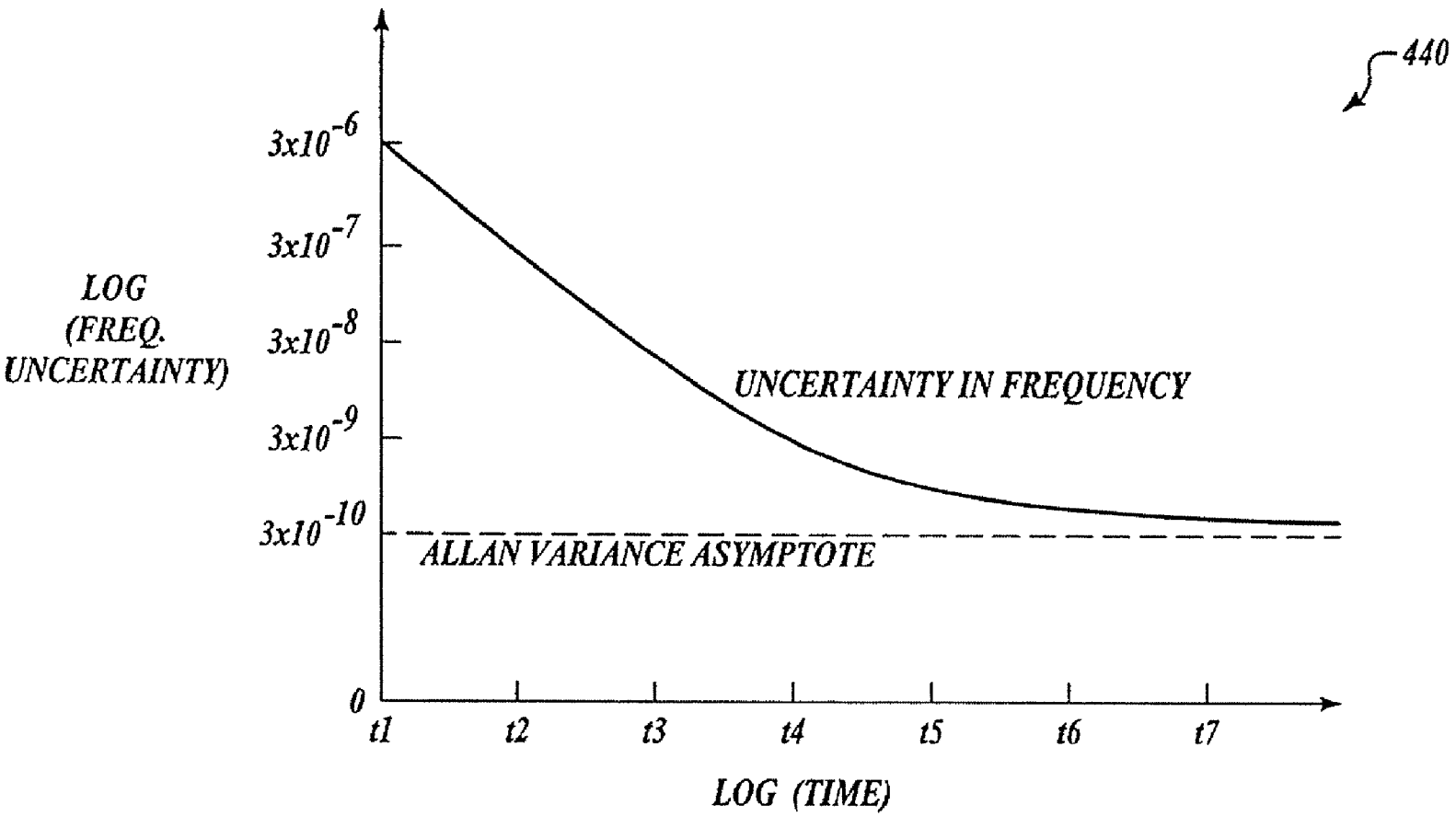

FIGS. 4A and 4B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$)is determined by the difference in the phases and the elapsed time between transmissions as: $f_{offset2}=[\phi_2-\phi_{ex2}]/[360\ (t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolveable ambiguities do not occur. The expected phase is based on a reception interval for an integer period of frames that is reasonable based on expected transmission/reception time intervals. Notice that the expected phase for this time corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f[_{offset2}]_{offset3}=[\phi_3-\phi_{ex3}]/[360\ (t_3-t_2)]$, where $\phi_{ex3}$ corresponds to the expected phase at time $t_3$. The expected phase is again based on a reception interval for an integer period of frames that is reasonable based on expected transmission/reception time intervals. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 5A:
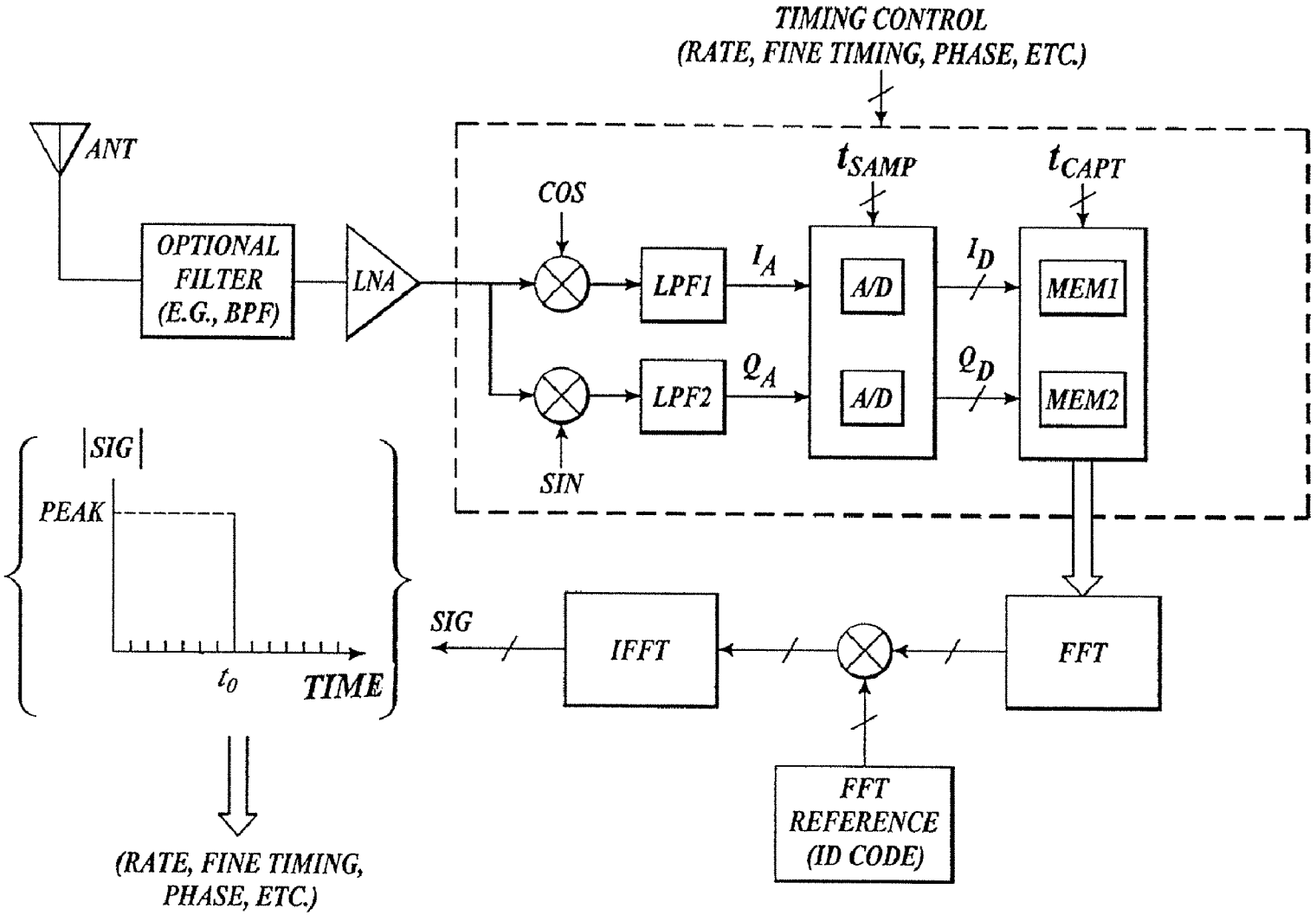
FIGS. 5A-5B are example diagrams for example receivers.

FIG. 5A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method with delayed use of the ADC.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Figure 5B:
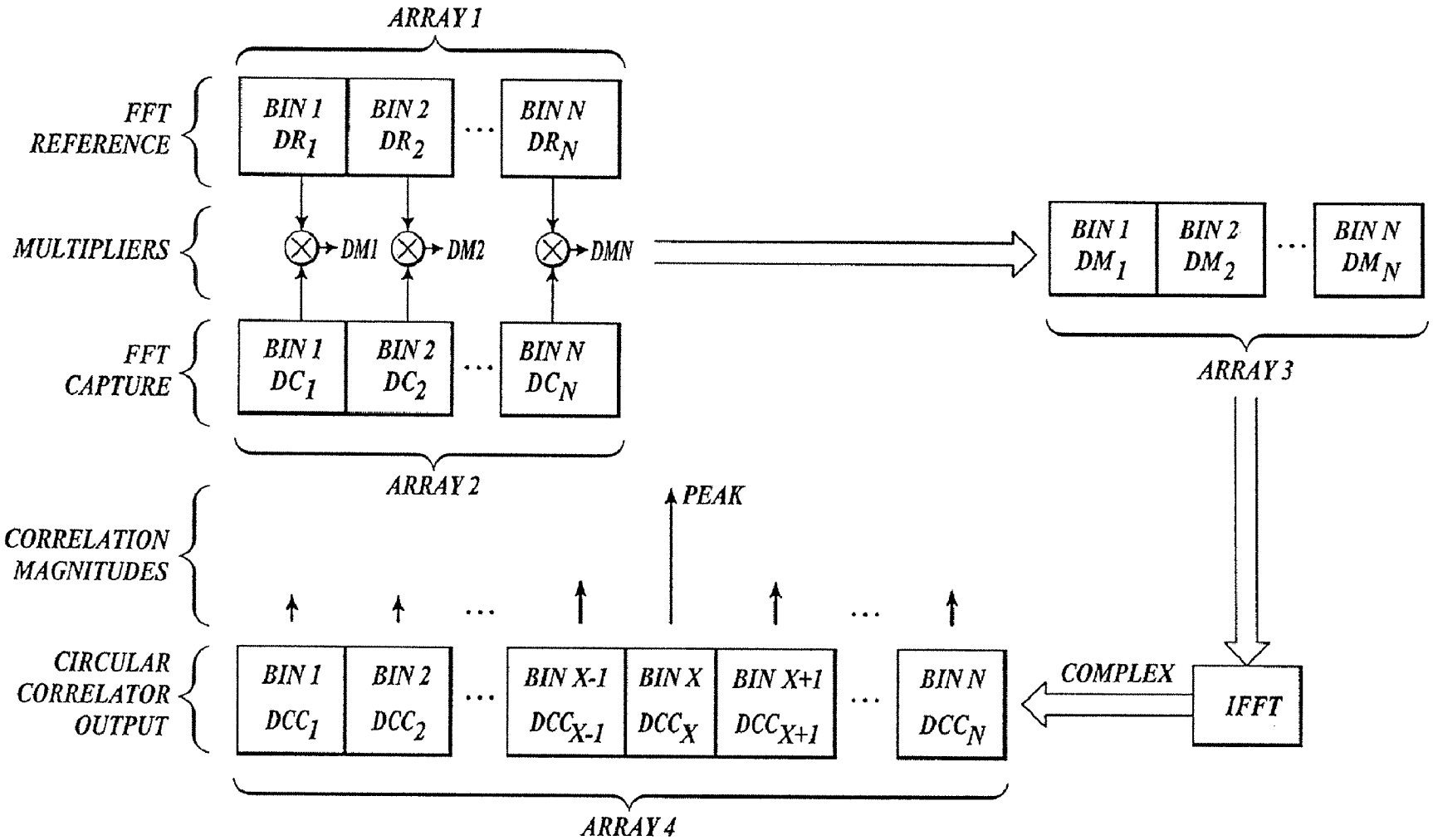

FIG. 5B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1 -BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference ad the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flow

Figure 6:
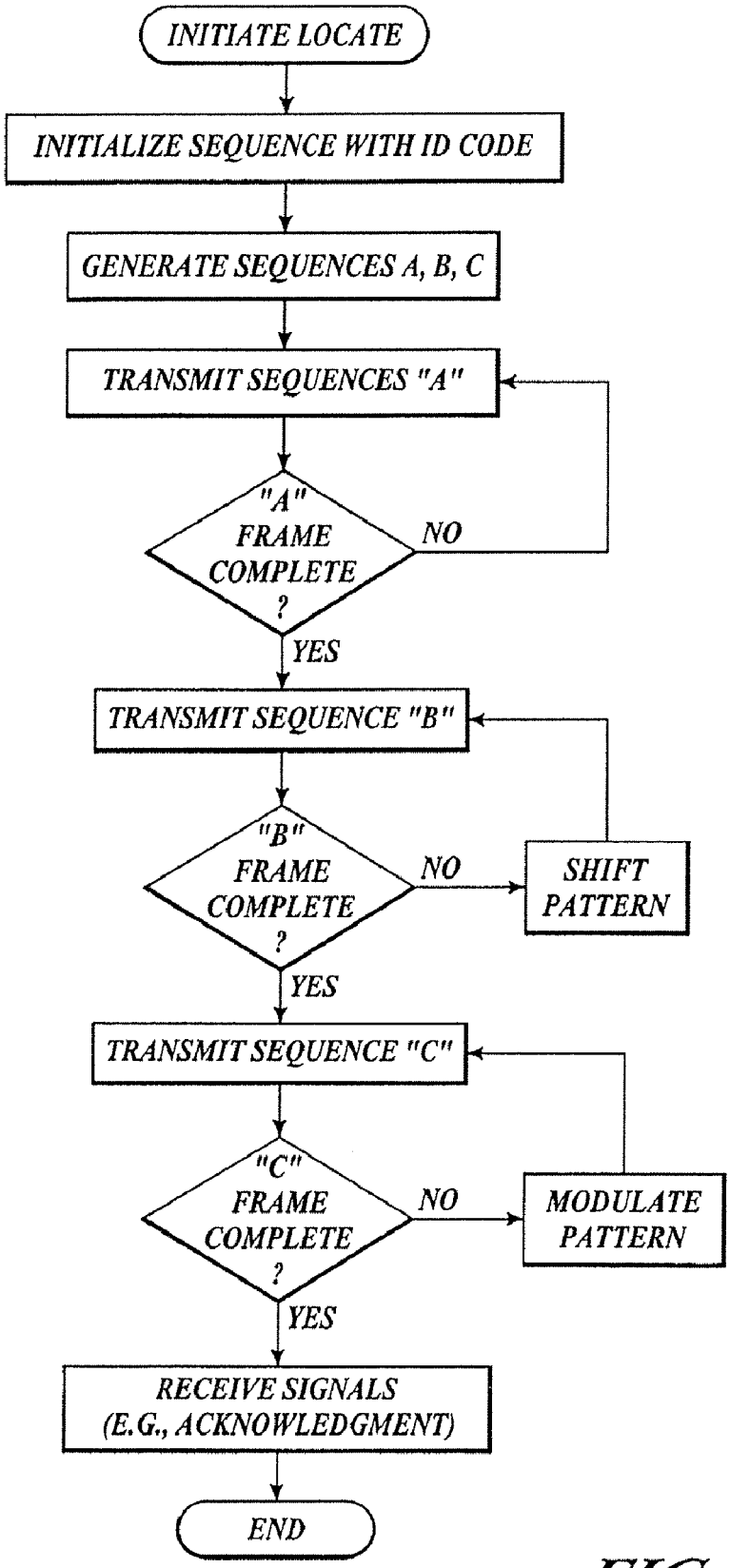
FIG. 6 is a flow-chart for an example transmitter.

FIG. 6 is a flow chart for an example transmitter in either a MT or a RL. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"), or the equivalent time has expired for transmitting the pattern "A" frame in the case of hollowed frames. The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), or the equivalent time has expired for transmitting the pattern "B" frame in the case of hollowed frames, the RL begins transmitting the "C" pattern. The sequence of "C" patterns includes modulated data that may correspond to command and control information for the MT. After the modulated data is transmitted (e.g., 64 sequential pattern, or frame "C"), or the equivalent time has expired for transmitting the pattern "A" frame in the case of hollowed frames, the RL stops transmitting and switches into a receive mode.

In the receive mode, signals are received from the MT with the RL in a similar format as provided between the RL and the MT. The RL can then calculate a distance and location based on the round-trip time and Doppler shift in the received signals as previously described. Moreover, the received "C" frame transmission may include data that is communicated between the MT and the RL, which is extracted and evaluated by the RL. Such data may include: physiological information such as heart rate, body temperature, blood pressure, heart rhythm, blood-sugar level, as well as other sensory information that is associated with a user of the MT.

Figure 7A:
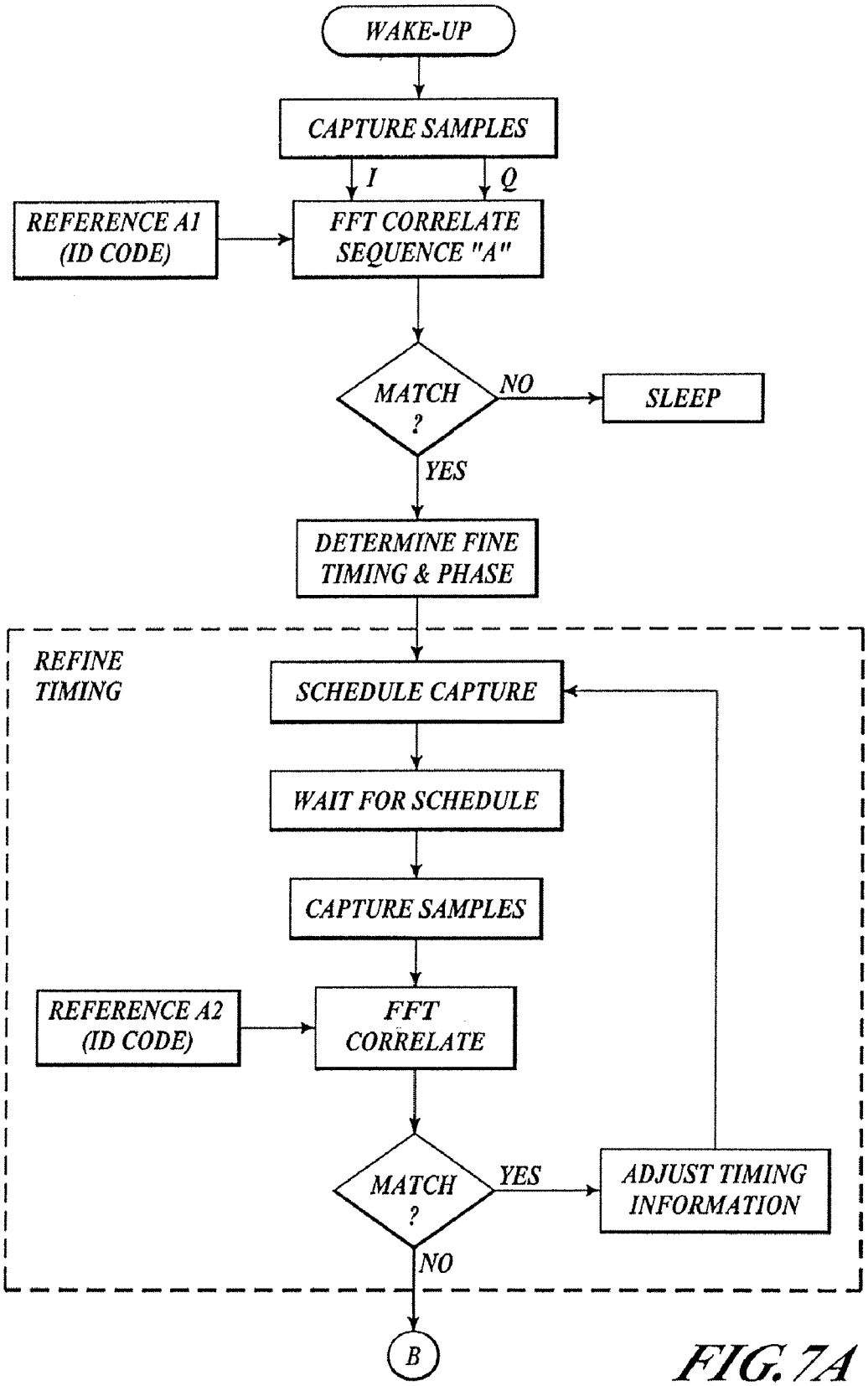
FIGS. 7A-7B.

FIGS. 7A is an example flow chart for an example receiver in a MT. Processing begins when the MT is activated out of a sleep mode (e.g., WAKE-UP is initiated). FIG. 7A illustrates the capture of samples associated with sequence "A" (or frame "A"). After wake-up is initiated, the receiver captures noise and/or signals. The MT will attempt to correlate the captured noise and/or signals with an expected transmission sequence that is encoded with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with an expected transmission sequence that is encoded with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 8A.

Figure 7B:
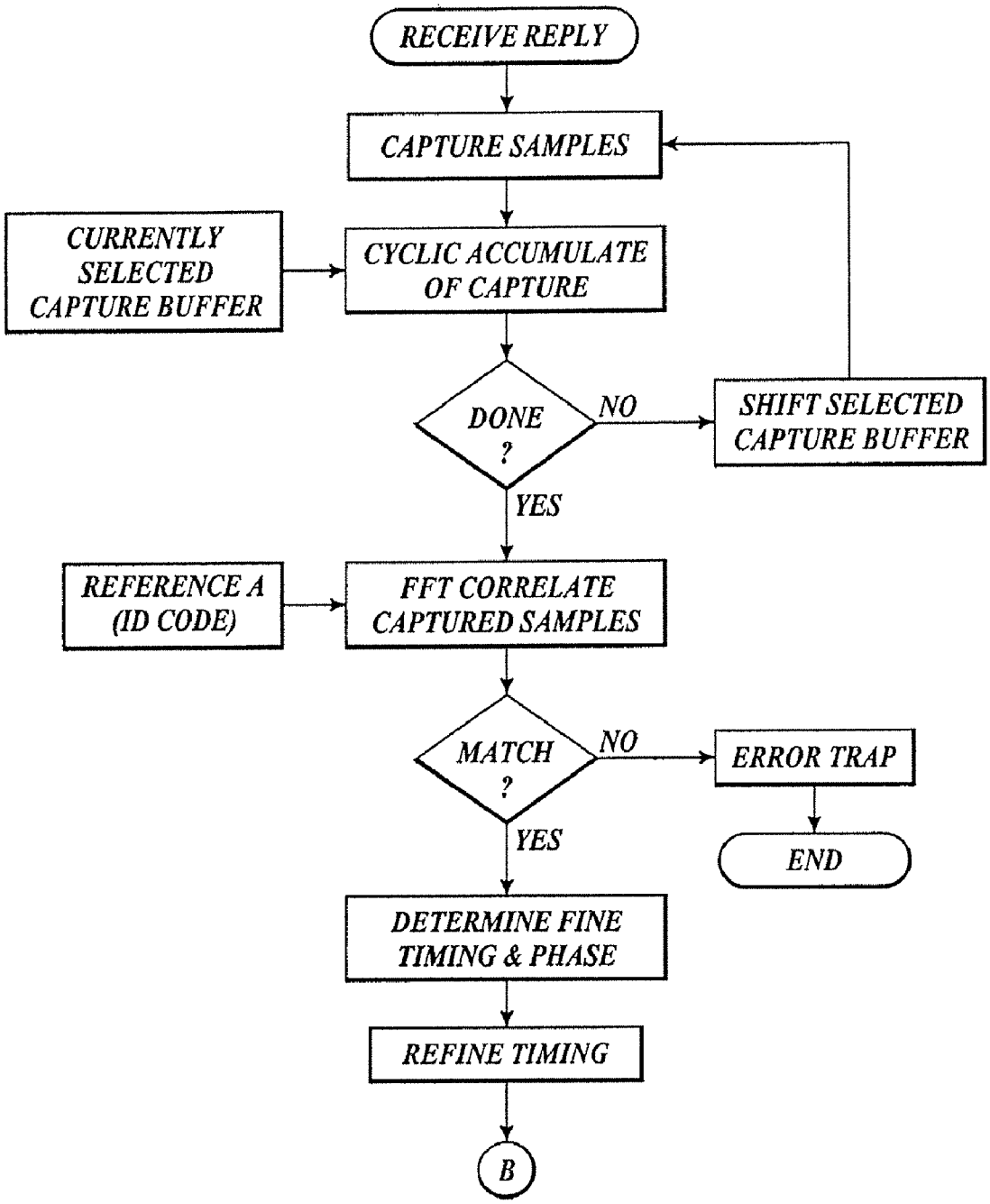

FIG. 7B illustrates the capture of samples associated with sequence "A" (or frame "A") in a receiver of an example RL device. Since the MT has limited power available for transmission, the signal may be considerably weaker than that from the RL. After wake-up is initiated by the RL, the receiver captures noise and/or signals. The RL will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the RL device for estimating time for reception, etc.

After the predetermined time interval expires, the RL attempts to FFT correlate the accumulated/captured signals and noise with an expected first transmission that is encoded with the first portion of the unique identifier for the specific RL. The accumulation of the captured patterns over the sequence using the described cyclic accumulation improves the signal levels and minimizes the impact of noise on the reception. When the correlation fails to identify a match, the RL determines that the transmission is intended for another device, that no transmission is present, or that an error has occurred, and returns to a sleep mode. Alternatively, the RL fine timing and phase information from the transmission sequence is used to refine the receiver timings for the RL. Processing then continues to capture and evaluate pattern B as will be described with respect to FIG. 8B.

Figure 8A:
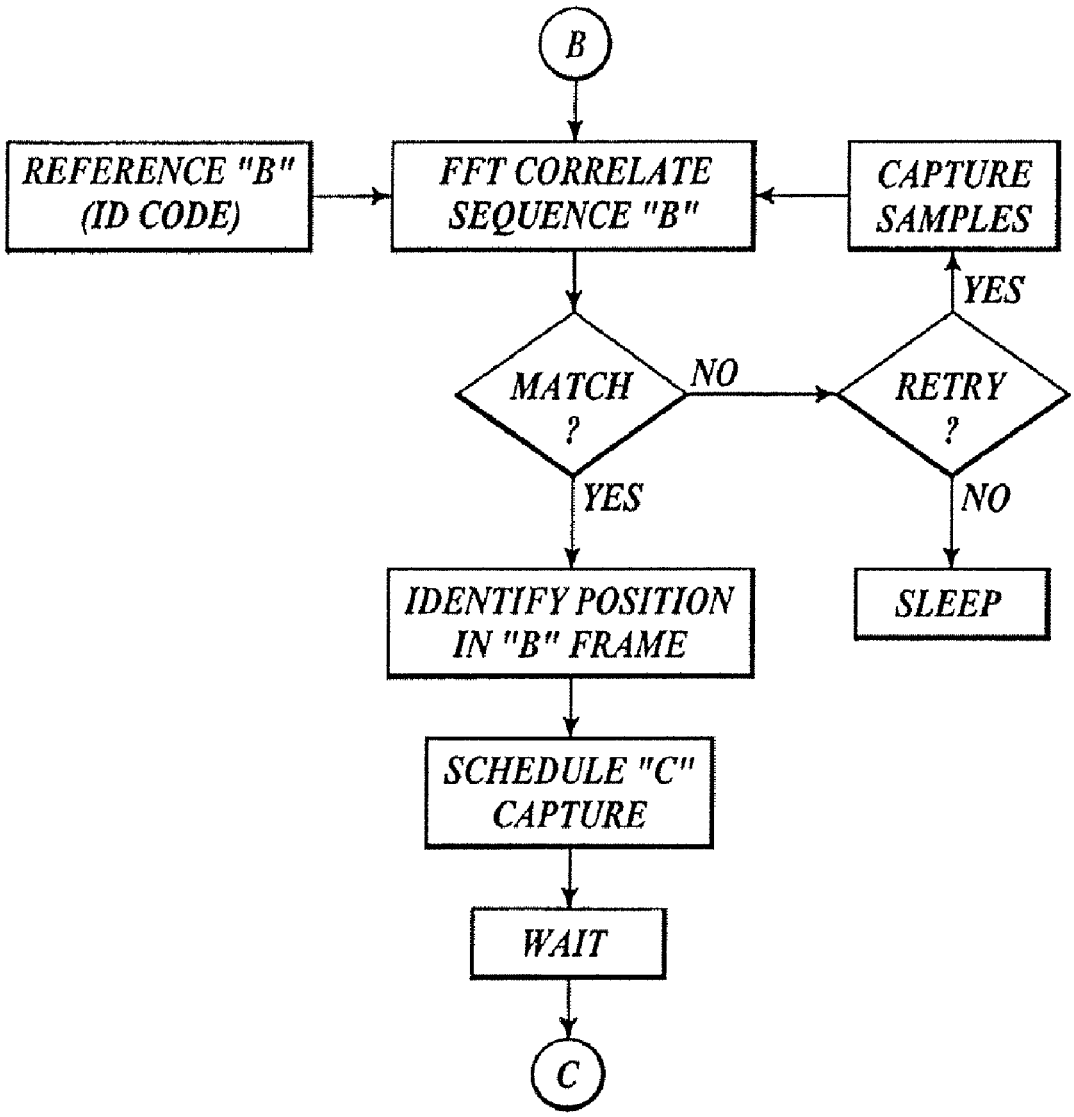
FIGS. 8A-8B.

FIG. 8A illustrates the capture of samples associated with pattern "B" in a MT device. The receiver captures a sequence of samples, assuming those samples correspond to sequence "B". The MT will attempt to FFT correlate the captured samples with an expected second transmission that is encoded with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 9, which follows further below.

Figure 8B:
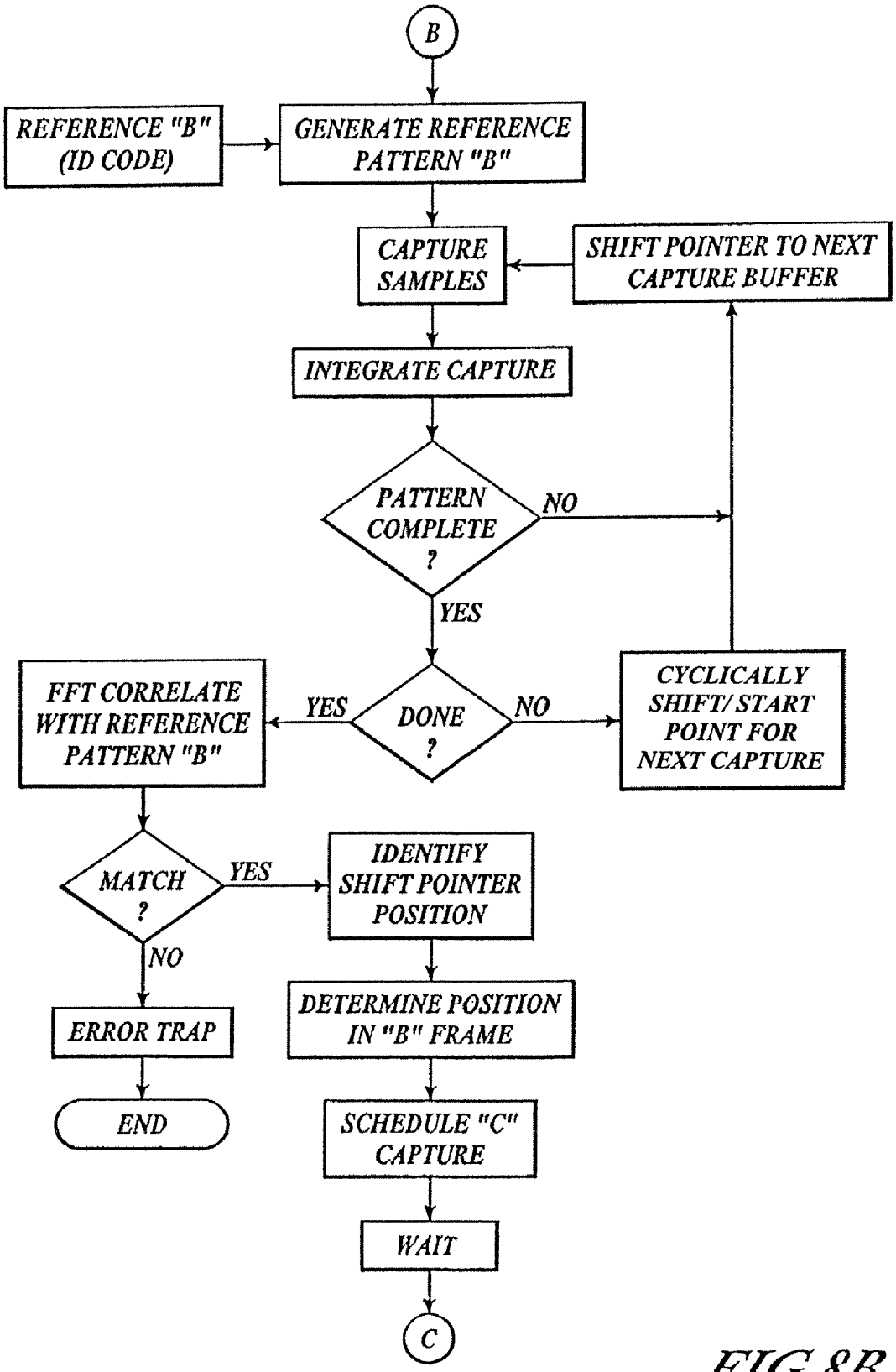

FIG. 8B illustrates the capture of samples associated with pattern "B" in a RL device. The receiver captures a sequence of complex samples (e.g., 4096 complex samples), assuming those samples correspond to sequence "B" using a cyclic accumulation/integration technique that is similar to that previously described for FIG. 7B. A reference pattern associated with pattern "B" is generated. Each received sample is captured and placed in a respective one of a series of buffers, where each buffer has an associated index such as a pointer. Each subsequently captured sample is placed in a different capture buffer (e.g., a capacitive storage cell).

As previously described with respect to the MT, sequence "B" is transmitted multiple times for receipt by the RL, where each subsequent "B" sequence is cyclically rotated with respect to the preceding sequence (e.g., see FIG. 3). As time moves forward a different capture buffer is used as the starting point for capturing a sequence by the RL. For example, assuming 4096 complex sample pattern with a starting pointer to capture buffer 0, captures will be placed in buffers 0-4095 sequentially followed by capture buffer 0. Each buffer can be an analog storage cell so that samples from the first pattern are accumulated with the samples from the second pattern using the described method. After numerous accumulations of additional patters, integration is completed and the accumulated signal can be evaluated.

After all of the samples for a pattern sequence "B" (e.g., 4096 complex samples from a sequence of pattern "B") are received (i.e., "pattern complete") and accumulated, the RL will attempt to FFT correlate the integrated captured sequence with the previously generated pattern for pattern "B". When the FFT correlation fails to identify a match, the RL falls into an error trap. Processing a received sequence may expire without match when the transmission is intended for another MT, or perhaps when an error has occurred. An error trap handles the remaining processing when an error occurs.

When the RL finds a correlation match for the generated pattern "B" (or any subsequently rotated version thereof), the RL can then determine the relative position of the matched pattern within the sequence (or within the frame) based on the shift position in the pattern that yields a match. Since the timing, phase, and frequency information are now known, the RL schedules to receive the "C" sequence. Processing continues for the RL in FIG. 9, which follows below.

In some examples systems the "B" sequence is sampled at four times the transmitter sequence rate, with each sequence step being four samples. For this example, the receiver samples at half the transmit rate so that each shift in the pattern corresponds to two buffer locations. In other words, the starting point for each "B" sequence capture for this example always corresponds to an even numbered buffer (e.g., 0, 2, 4, . . . ). The RL can then determine the relative position of the matched pattern within the sequence or frame by evaluating the starting point index to the buffer or sample bin that matches or correlates to the expected pattern.

Figure 9:
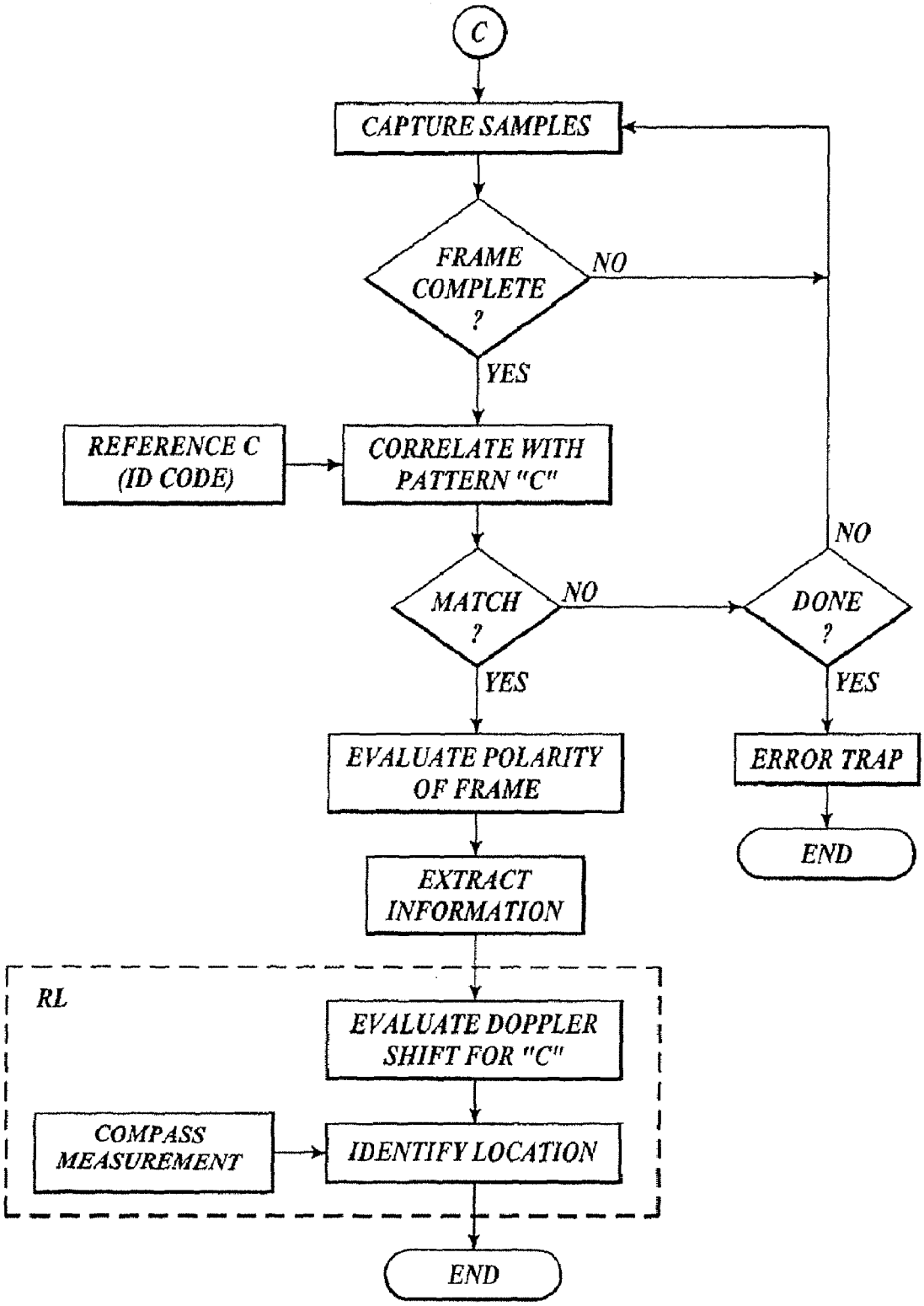
FIG. 9 are flow-charts for example receivers.

FIG. 9 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the RL) with an expected third transmission that is encoded with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from the compass sensor and can be utilized to assist in determining location as will be described later.

Example Operational Features and Observations

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and RL's time bases (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of $0.5/3 * 10^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected at a level of around −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 μs would correspond to a first complete signal null.

The RL will in general receive a signal whose cadence and frequency very closely match its internal crystal clock, and thus the RL can use long cyclic integration times, which greatly increase the available signal to noise ratio. The described coherent integration (or coherent accumulation) process has a signal power maximum when the signal has rotated through 180 degrees at the end of the capture interval. For a 3.5 ppm frequency tolerance, when the period of the spread signal is designed to be about 150 μs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

MT Reverse Locator Operation

The described system performs distance measurement by round trip time measurements. According to the present disclosure, an economical solution is available for a [remote locator (MT)] *MT* device that includes a compass sensor. The compass sensor is adapted for use in the MT such that the target direction (the direction towards the RL from the MT) can be continuously displayed despite any relative change in the MT's orientation. Diversity antennas can be used to gain additional information about signal strength, distance and Doppler, etc.

Initially, when the user of the MT seeks to find an RL, a "search" mode is engaged. When the MT receives a satisfactory signal from the RL, the MT transmits a reply message to the RL such that the RL can determine the distance to the MT. The RL then transmits the distance calculation back to the MT, which can provide an appropriate alert indicator to the user. Alert indicators may include, for example, an audible indicator via the audio output device, a visible indicator via the video output device, or a vibrating indicator.

After the initial search and alert are completed, the user can activate a "locate" mode. In the locate mode, the user holds the MT away from the body approximately at an [arms] *arm's* length. The user then moves the MT through at least a portion of an arc or through a complete circular motion that is centered approximately about the users head). During the locate mode, the RL will handshake many times with the MT while acquiring a series of data items such as time of arrival (TOA), and Doppler readings which are interferometric. As the MT is spun in a circular motion, compass readings are also taken. The compass readings are associated with distances and Doppler readings that the RL is taking. The RL communicates back to the MT the various correlator phase data and the distance measurements so that the MT can identify a direction and distance to the target.

The distance change associated with the rotation of the MT is doubled by the round-trip transit time. In one example, a user may extend the MT away from his body around 70 cm of distance, and the corresponding round-trip time variation is around 280 cm, or about 8 waves at a frequency of 915 [Mhz] *MHz*.

The heading from the MT to the RL is unknown until at least a partial rotation is complete and sufficient data is collected from the compass readings, distance measurements, and Doppler readings to resolve the proper direction. The correlator in the RL is arranged to generate correlation phase information heading between the MT and the RL.

As described, the MT is arranged to collect a series of compass headings and distances to resolve a target location for the RL. The motion or action required of the user is relatively intuitive in that the circular motion required for the MT is similar to the motion required for a user to visually search by "looking around" their current location. The cost of a MT that is employed in the above-described examples is reduced considerably since the compass sensor device is very economical (currently less than approximately two dollars).

The operation of the MT requires a reasonable amount of contact with the RL to maintain consistent timing information. It is expected that a common application of the present disclosure is an RL installed in an automobile, and an MT located in a key-fob style device. In such applications, the range between the RL and the MT is manageable. However, it is expected that contact can be lost between the MT and the RL for extended periods of time (e.g., a long shopping excursion where the key-fob is out of range for several hours). When contact between the MT and the RL is lost for several hours, the transponder is aware of the accumulated time uncertainty between the time base of the MT and that of the RL.

Figure 10:
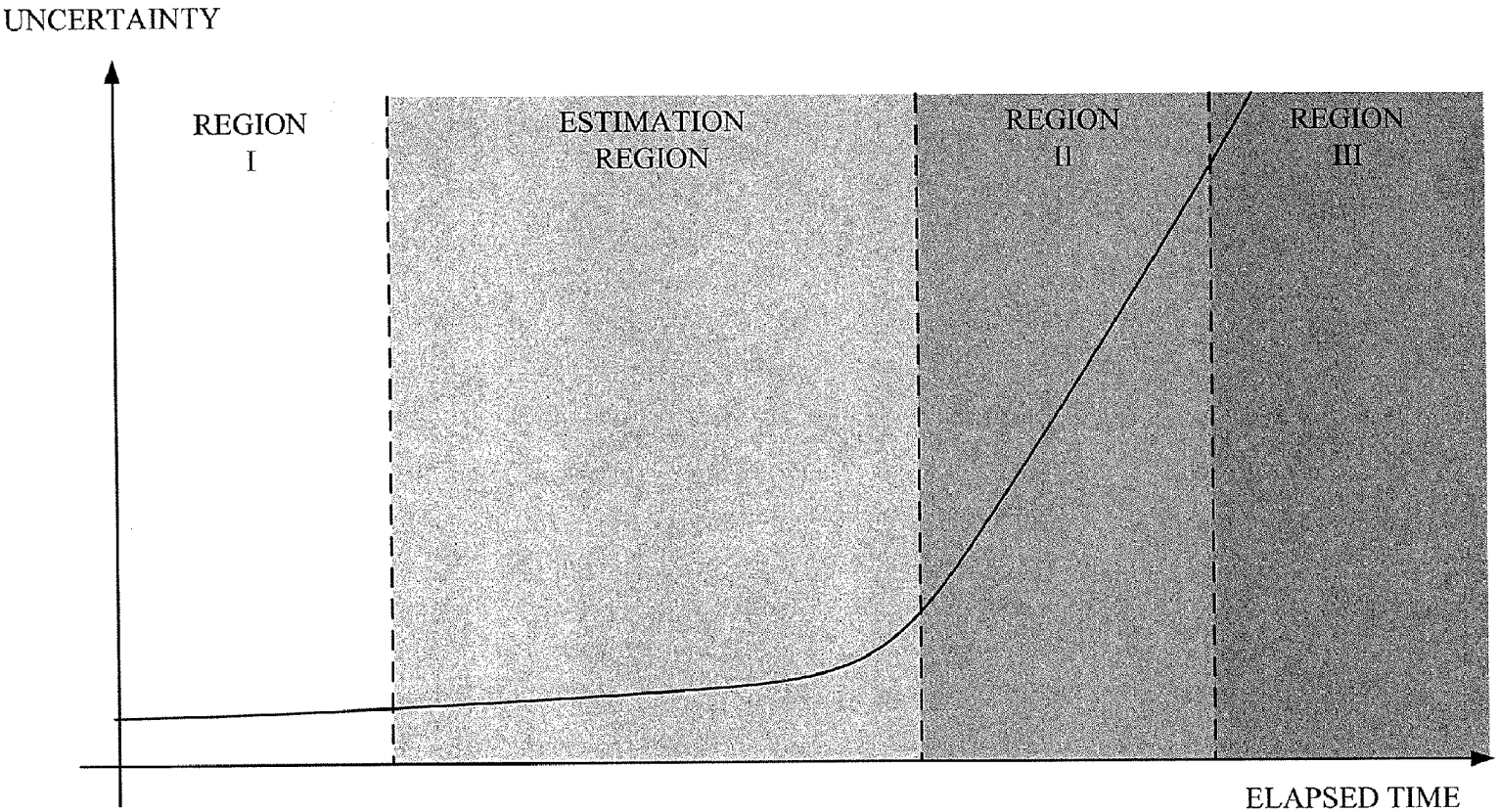
FIG. 10 is an example graph for uncertainty between the MT and RL time base versus elapsed time between communications.

FIG. 10 illustrates the time uncertainty between as a function of elapsed time without synchronization. Region I depicts an elapsed time between a few seconds and about one minute of elapsed time without communication between the MT and the RL. In Region I, the uncertainty is very low and has almost no slope at all. Region II depicts an elapsed time of about one hour to multiple hours. In region II, the uncertainty is increasing rapidly at a rate of about 3 parts per million (3 ppm). Region III depicts an elapsed time of many hours, weeks, or longer without contact between the MT and the RL. In Region III, the uncertainty is so high that we are unable to easily establish communication since the time bases have likely gone very far out of synchronization. Between Region I and Region II the slope changes between relatively flat and exponential and thus the uncertainty can only be estimated at best.

The MT is aware of the time of last contact and thus can also know the accumulated time uncertainty between [it's] *its* time base and the locator time base. As an example, we might have a maximum medium term drift rate of 3 parts per million. An absence of 4 hours without a communication link between the MT and the RL will result in a mutual time uncertainty of 12 micro-hours, or +/−43 milliseconds. In this case, if the person with the key fob wants to find their car, having returned to the Disneyland parking lot, a button push will cause the MT to quickly scan through its time slots looking for the 600 microsecond RL transmission. To accomplish the scan, the MT must be active for a total of about ⅓ of the +/−43 millisecond time span. The RL-MT link will be reestablished assuming the distance between them is not excessive.

In this way, the information regarding time uncertainty is very effectively used. The MT in this case uses the available communication channel to receive from the RL in the automobile, the distance to the car. As with the Spin-Around locator, the spin process can be done, with distance data passed from the car to the MT, and an electronic compass in the MT allows the MT to convert the real time distance data to a direction to the vehicle. Since the key fob (the MT) has an internal compass, it can literally point to the car.

The addition of another antenna in the RL can help refine the directional indication. For example, as illustrated in FIG. 1A two antennas can be located in the car with one remote from, or orthogonal to the other. The differently oriented antennas can be used to identify if the RL is located on a different level from the MT in a multi-level parking structure. Since the MT still only requires a single antenna [in the transponder,] the key fob can remain small and economical.

The above described example operation illustrates that the RL is arranged to provide the measure phase and distance information to the MT unit, and that the MT unit evaluates the received information along with the MT's own measured compass information to determine the direction from the MT to the RL. Other alternative implementations are also contemplated where the compass information that is collected from the MT is transmitted in an encoded message to the RL (e.g., in a part "C" message). For this alternative example, the RL is arranged to extract the compass information from the encoded message and then calculates the direction and distance information locally on the RL. At the end of the "locate" mode for this example, the RL unit transmits the distance and direction information to the MT. The MT receives the encoded transmission, extracts the distance and direction information, and provides the information as output (an audible output, a visible output, or a combination thereof. This specific example may be used to reduce the number of transmissions necessary for determining the distance and direction finding functions.

In still another alternative implementation, a second antenna is included in the RL unit and the RL is arranged to process the information from both antennas two determine when the MT is directionally "pointing" towards the RL. In this example, the compass chip is unnecessary since the two antennas work together to determine the most appropriate direction, where the MT can simply provide a visible and/or audible indicator when the MT is oriented in the correct direction.

In a further enhancement, a locate mode for the MT can be used to determine if the RL is located in an upper or lower level relative to the MT. This may be particularly useful for implementations such as a car locator in a multi-floor parking structure. By rotating the MT through a vertical arc during the locate mode, the MT can then determine a direction for the RL in a higher, lower, or at the same level of a multi-floor structure relative to the MT.

Look Around Procedure

Figure 11C:
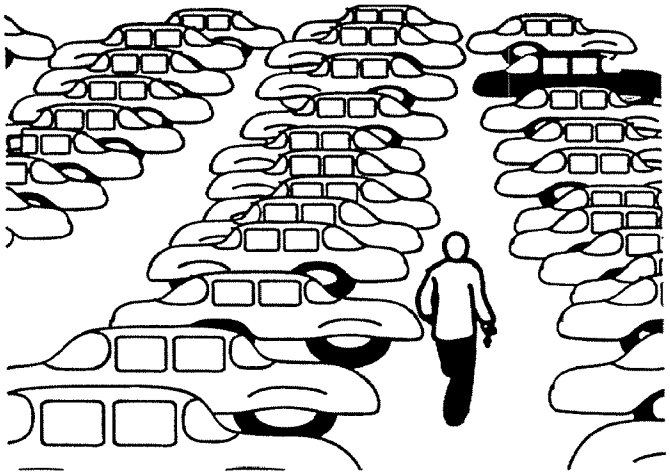
FIGS. 11A-11C are example illustrations for a look-around procedure that is employed by a user in a search and locate mode.
Figure 11B:
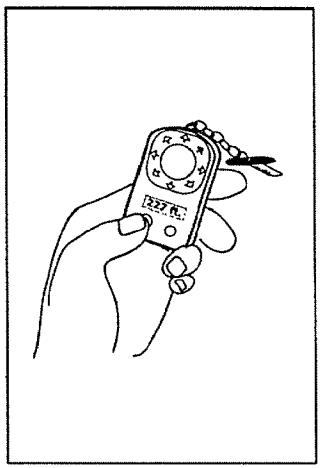
Figure 11A:
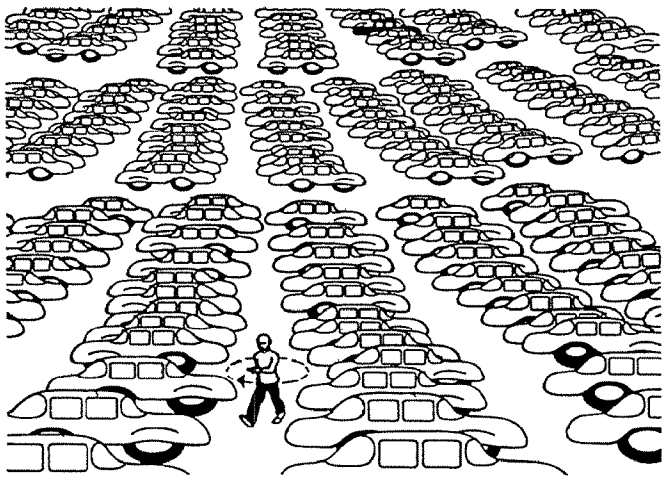

FIGS. 11A-11C are example illustrations for a look-around procedure that is employed by a user in a search and locate mode arranged according to at least one aspect of the present disclosure. The procedure illustrated by these figures depicts a person that is searching for their car in which is in a large parking structure with numerous cars. The car has a RL device affixed therein. The description is not intended to be limited to locating cars, and can be used to locate any object, building, machinery, or other thing that has a RL device affixed thereto.

As illustrated in FIG. 11A, the person comes out into the parking area where the car is located while holding an MT device that is located in a key fob. The person activates the MT device into a search mode by pressing one of the buttons on the device (see FIG. 11B), and the MT receives a ping from the RL if within range. The MT transmits a reply to the RL. When the RL recognizes the reply from the MT, the RL transmits distance information to the MT in another encoded ping. The MT receives the distance information and provides a user alert that the car has been found. The user alert, for example, can be an audible beep, a single tone, a ring-tone, or a visible indicator. At this point the person activates the locate mode by pressing one of the buttons on the MT device. During the locate mode, the person extends their arm away from their body and rotates the MT about their centerline (e.g., see the dotted line in FIG. 11A), such as by pivoting about their heels.

Once a sufficient rotation has been completed for the MT to locate the RL ([aka] *a.k.a.* the car), a directional indicator is illuminated on a display of the MT device as shown in FIG. 11B. Also shown in FIG. 11B, the distance between the RL and the MT is displayed indicating that the car is located 227 feet away towards the front and right. As shown in FIG. 11C, the person then walks in the direction of the arrow on the display of the MT to locate the car (indicated as the shaded car in the back). As the person approaches the Car, the distance measurement will be updated to indicate that they are getting closer and closer. Once the person is within a close proximity (e.g., 10 feet) of the car, the MT can provide a short audible indicator, visible indicator, or vibrating alert prior to activating a sleep mode.

Ping Modes

Figure 12A:
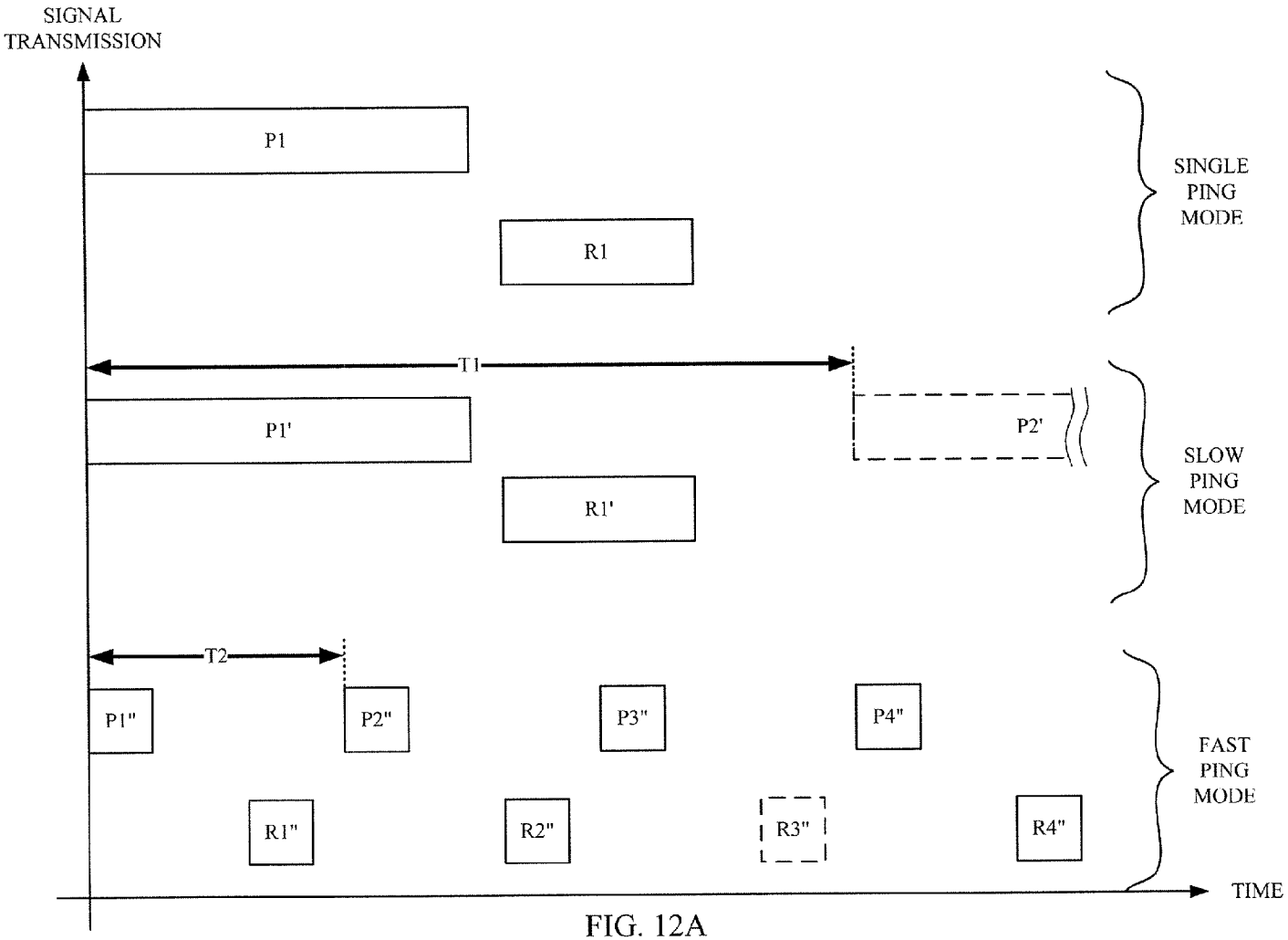
FIG. 12A is an example diagram illustrating slow ping mode, and fast ping mode.

FIG. 12A is an example diagram illustrating single ping mode, slow ping mode, and fast ping mode. As previously described a "ping" corresponds to a complete transmission by the RL to the MT, such as a complete set of the three frame transmission sequence. Similarly a "reply" corresponds to a complete set of frames from that are transmitted from the MT to the RL. In FIG. 12A, each block designated as Px is intended to indicate a time of transmission for a ping that includes a complete set of frames, while Rx is intended to indicate a time of transmission for a reply that also includes a complete set of frames.

In the slow ping mode, the RL is arranged to continuously transmit a series of single pings [(P1, P2 . . . PN)] (*P1', P2'. . . PN'*) to the MT. Each subsequent ping is separated in time by a ping interval (T1) as illustrated. The MT receives each ping when it is located within a transmission range of the RL for proper reception, and transmits a corresponding reply [(R1, R2 . . . RN)] (*R1', R2' . . . RN'*) for each ping that is properly recognized as coded for the particular MT.

In the fast ping mode, the RL is arranged to continuously transmit a series of single pings [(P1', P2' . . . PN')] (*P1", P2" . . . PN"*) to the MT. Each subsequent ping is separated in time by a ping interval (T2), which is significantly shorter in time than ping interval T1. The MT receives each ping when it is located within a transmission range of the RL for proper reception, and transmits a corresponding reply [(R1', R2' . . . RN')] (*R1", R2" . . . RN"*) for each ping that is properly recognized as coded for the particular MT.

It is important to note that the MT may not always be able to properly receive a particular ping from an RL in even though it is properly coded for recognition by the MT. Environmental conditions such as noise, buildings, and other electronic interferences may inhibit a ping (e.g., ping [P2)] *P2'*) from reaching the intended MT. Similarly, environmental conditions may [cause] *prevent* a reply (e.g., reply [R3'] *R3"*) from reaching the intended RL.

Power Conservation and Signal Interference Reduction by Hollowing Transmission Frames The described system performs distance measurement by round trip time measurements. The reverse locator is arranged to provide regular communications between the RL and the MT without excess energy consumption or spectral pollution. After a transponder and locator have exchanged signatures, they share very precise mutual clock rate information. The accuracy of this clock rate information, absent any Doppler shift, is one part per billion or better. As time elapses between transmissions, the unit time bases, which aren't perfectly steady, will drift with respect to each other. By calibrating the low-speed sleep mode oscillator against the high-speed clock, so that a given sleep period can be accurately enumerated as a known number of high-speed clock periods, it is possible to accurately measure periods of several minutes without actually operating the high-speed clock. However, a long initial baseline for frequency determination is necessary to initially synchronize the clocks between the MT and the RL. Once synchronized/calibrated, excessive accumulation of reply transmissions from the MT is not necessary since precise timing is known.

To reduce power consumption and reduce interference from other devices, the transmission frames can be "hollowed out" or thinned. The benefit of hollowing out the transmission frames is that there is a drastic reduction of radio noise, allowing other equipment or other locators to operate in the same local area. The benefit of hollowing the MT and RL transmissions is a huge reduction in energy consumption and a reduction in interference with other devices.

The hollowing out of the MT reply signal can be done when the MT and the RL are relatively close to one another since the MT's low power signal is normally integrated by the RL. In reverse locator mode, the RL is arranged to monitor the distance of a proximate MT such that power conservation by thinning or hollowing is possible.

Figure 12B:
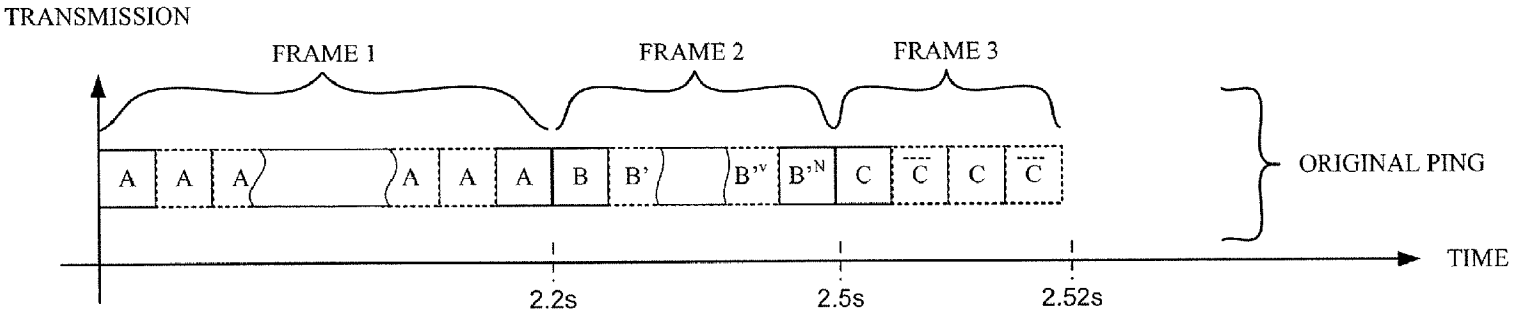
FIGS. 12B and 12C are an illustration of example thinned or hollowed out transmission frames.
Figure 12C:
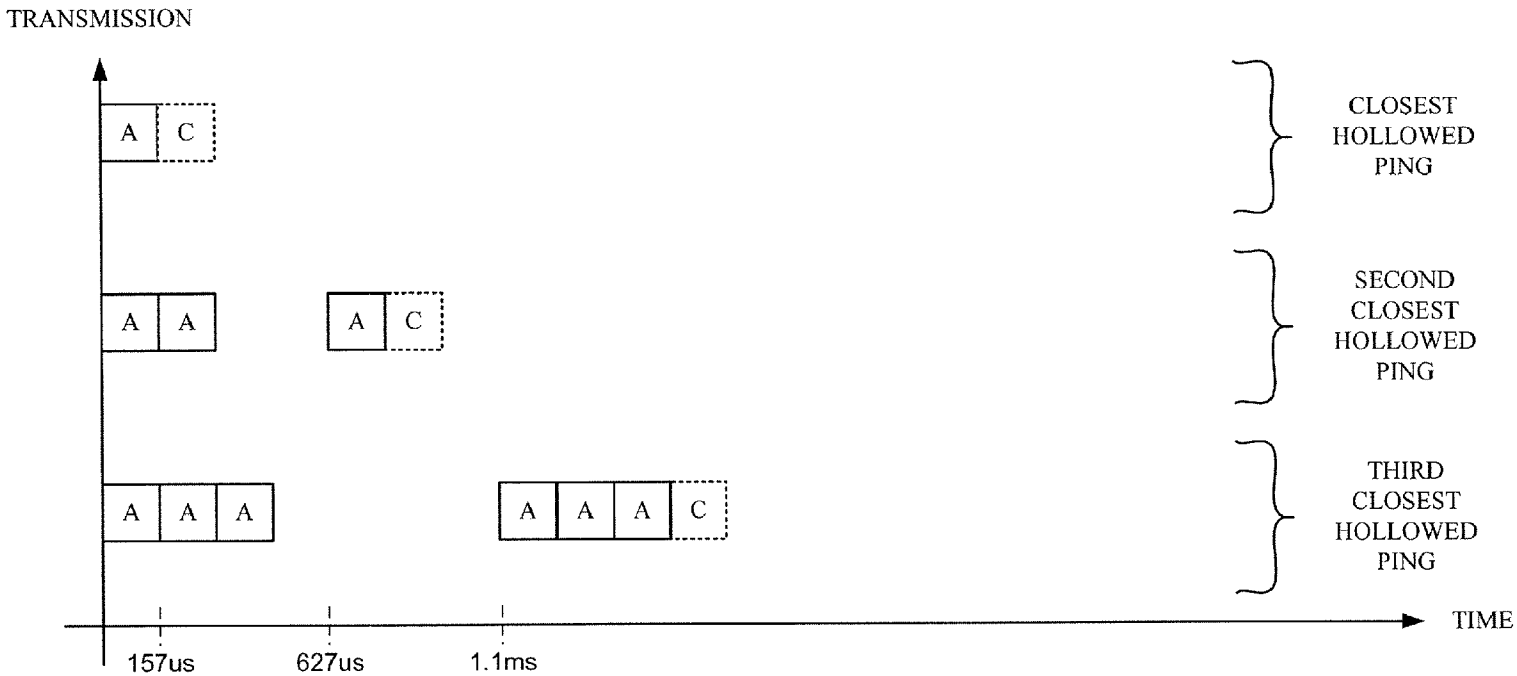

FIGS. 12B and 12C are an illustration for example of thinned or hollowed out transmission frames. As previously described, a ping is transmitted from the RL to the MT, where the ping consists of a multi-frame transmission such as the three frames illustrated in FIG. 12B. By way of example only, the transmission frames described for the RL are substantially similar to that described with respect to FIG. 3, but need not be so limited. As illustrated, frame 1 includes a sequence of pattern A, frame 2 includes a sequence of pattern B and the cyclically rotated versions thereof (e.g., B', B" . . . $B'^{N}$), and frame 3 includes a sequence of repeated pattern C encoded with any command and control instructions. The relative timing illustrated in this example indicates that the "A" frame extends about 2.2 s, while the "B" frame extends about 0.3 s to 2.5 s and the "C" frame extends about 20 ms to 2.52 s.

When the MT is located very close to the RL, the RL has a very high signal-to-noise ratio (SNR) and the frames provided between the MT to the RL can be hollowed out since long integration times are not necessary. As shown in FIG. 12C, at the closest proximity between the RL and the MT, a hollowed frame can be utilized that includes a single instance of pattern A and optionally a single instance of pattern C. It is important to note that pattern B is not transmitted since the MT and the RL continue to have accurate timing. As illustrated, the ping with a single pattern A has a transmission time of about 157 [us] *μs*.

As the MT travels further from the RL, the SNR degrades slightly and the RL and MT can increase the energy being transmitted. As shown in FIG. 12C, the number of patterns that are transmitted is increased as the distance between the RL and the MT increases. This process can allow for continuous monitoring of the MT for periods of a year or more. As illustrated, two A patterns are transmitted initially, and another A pattern is transmitted at time of approximately 627 [uS] *μs*. When the MT travels still further from the RL, the SNR continues to degrade and additional A patterns are transmitted. FIG. 12C illustrates three A patterns (about 471 [us] *μs*) repeating at a time of about 1.1 ms.

Since the low-speed clock is calibrated as a precise number of high-speed clock ticks, the transponder can sleep for short periods of time and resume with confidence regarding the approximate timing of upcoming signals, if needed. The problem of searching through A [&] *and* B for frame and packet timing information can be avoided in these instances. By allowing the transmitter to remain active, although quiet, the transmitter can later resume and the carrier and data phase timing are preserved. As a consequence of these factors, a synchronized transmitter and receiver can be arranged to operate as though a constant transmission is occurring, while ignoring the quiet times. Both the RL and the MT remain quiet during these portions of time while maintaining their respective high speed clocks active.

In general, when recent timing information is available and future sessions can be scheduled with good accuracy (~a few baud, or +/−200 [nS] *ns* or so), packets of sequence "A" can be reliably captured at the known times. These times can be close together or spaced apart in time. Receipt of the "A" transmission portion can be utilized to regain fine carrier timing since the gross timing from the "B" transmission is already known.

In situations such as reverse locator mode, after the initial full capture sequence is used to acquire gross and fine timing, subsequent captures maybe be as few as four "A" packets in a burst (600 [uS] *μs*), or several individual "A" packets spread out over a few [mS] *ms*. If "C" modulated data is needed, then the "C" packet can be sent. In some applications where the coarse and fine timing have been acquired and the RL and MT have not lost communications between one another, as few as zero "B" or "C" packets might be sent. In other situations where the RL and the MT lose contact between one another and the sequence position is lost (e.g., the uncertainty is approximately 50 [uS] *μs* of drift for sequences that are 157 [uS] *μs* long), the "B" pattern is required to bring the timing back into proper operation.

Example Operation of the RL in Search and Locate Modes

Figure 13A:
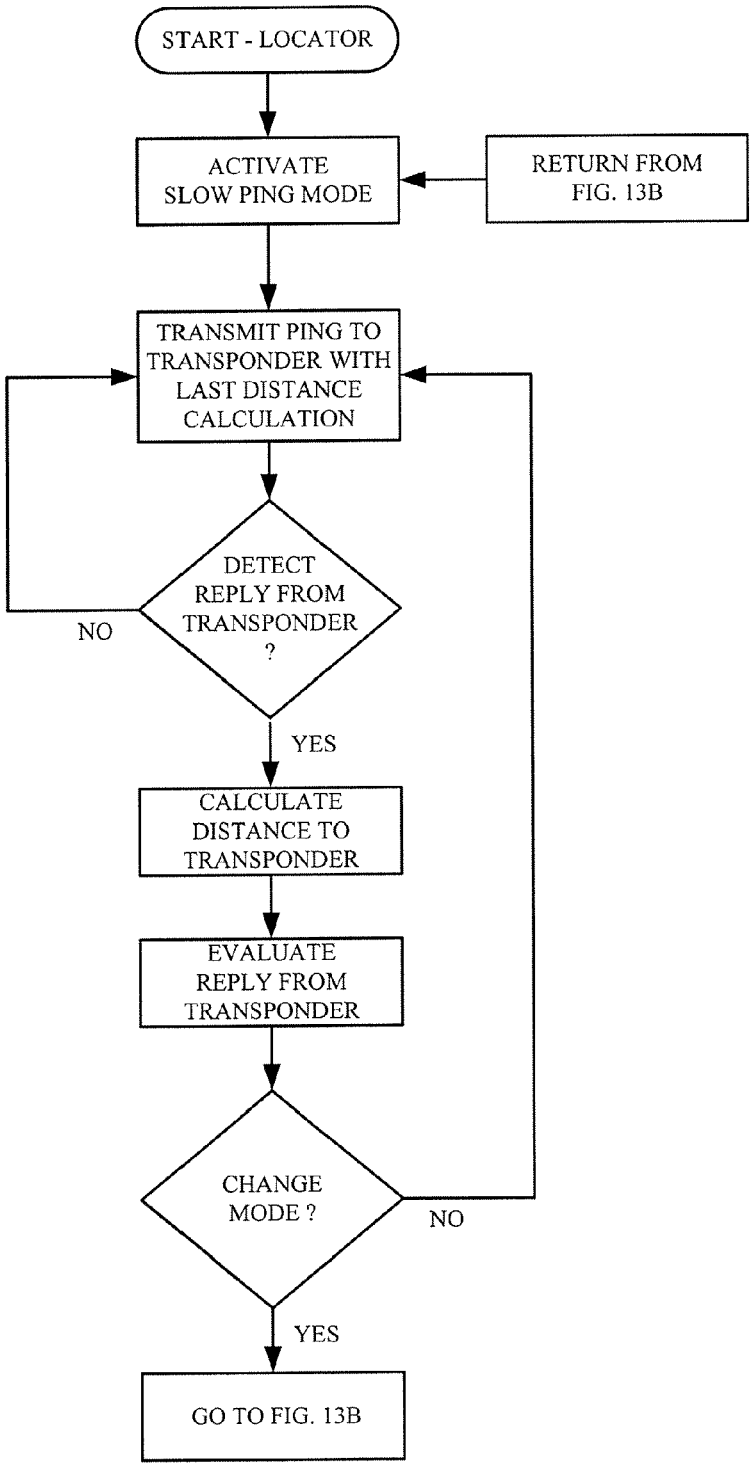
FIGS. 13A-13B are example flow charts for search and locate modes of an example remote locator (RL)
Figure 13B:
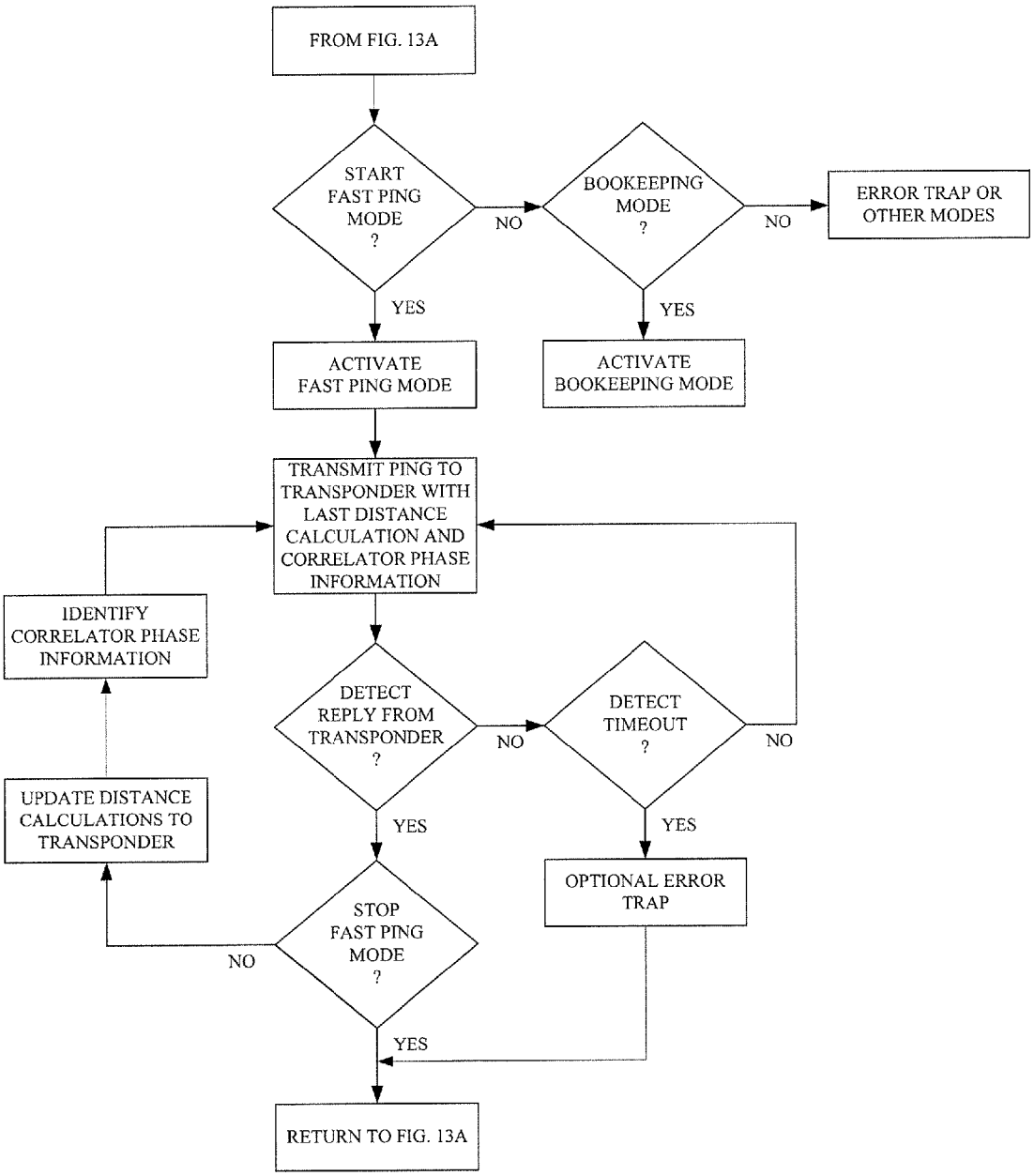

FIGS. 13A-13B are example flow charts for search and locate modes of an example remote locator (RL) arranged according to at least one aspect of the present disclosure.

Initially, the RL is in a search mode where the slow ping mode is active. The RL transmits pings that are coded for the MT, indicating the last distance that was calculated from the round-trip time between ping and reply. The RL also listens for replies from the MT. When a reply is received, the RL calculates the distance between the RL and the MT and evaluates the reply message from the MT for any mode change information that is requested. When a mode change is not requested, the RL continues transmitting pings to the MT that are encoded with pertinent distance information. When a change mode is requested, processing continues to FIG. 13B.

As described in FIG. 13B, the change mode request is analyzed by the RL. When the mode corresponds to a bookkeeping mode, a bookkeeping process is activated. A synchronization pairing procedure could also be employed, as well as any other desired mode.

When the locate mode is activated, the RL activates the fast ping mode. During the fast ping mode, the RL transmits pings to the MT that are coded with the last calculated distance and correlator phase information that was determined for a successful ping and reply pair. The RL evaluates any replies from the MT and determines if the MT has requested to stop the locate mode (e.g., stop the fast ping mode). When the fast ping mode continues, the distance calculations are updated between the RL and the MT, and the correlation phase information is identified for the received reply, both being coded into the next ping transmission to the MT. When the fast ping mode is terminated, processing resumes at FIG. 13A, where the slow ping procedure is initiated again. An optional error trap can be arranged to switch from fast ping mode to slow ping mode the communication link between the RL and the MT is lost over a timeout interval during the fast ping mode.

Example Operation of the MT in Search and Locate Modes

Figure 14A:
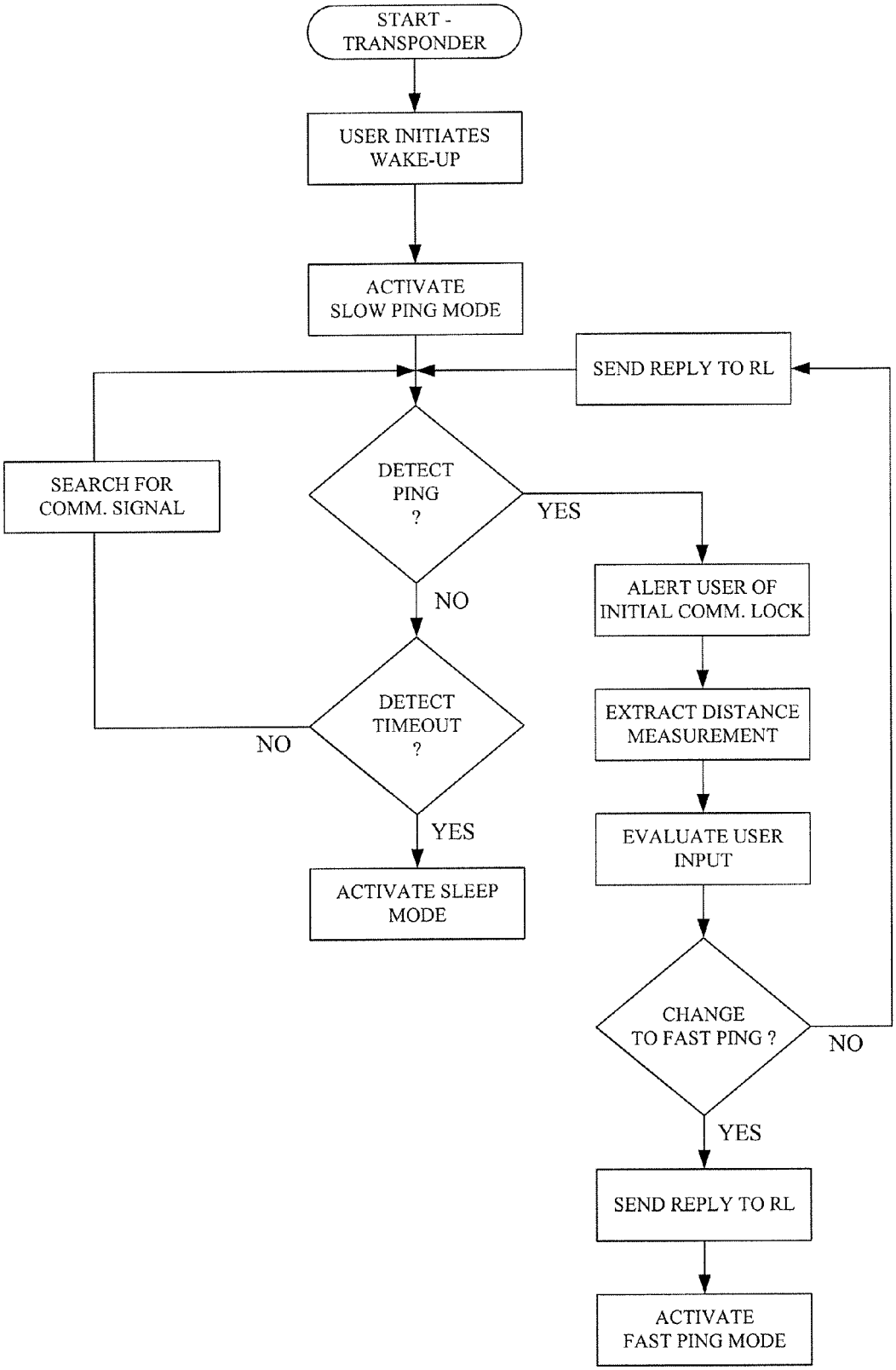
FIGS. 14A-14C are example flow charts for search and locate modes of an example micro-transponder (MT), arranged in accordance with at least one aspect of present disclosure.
Figure 14B:
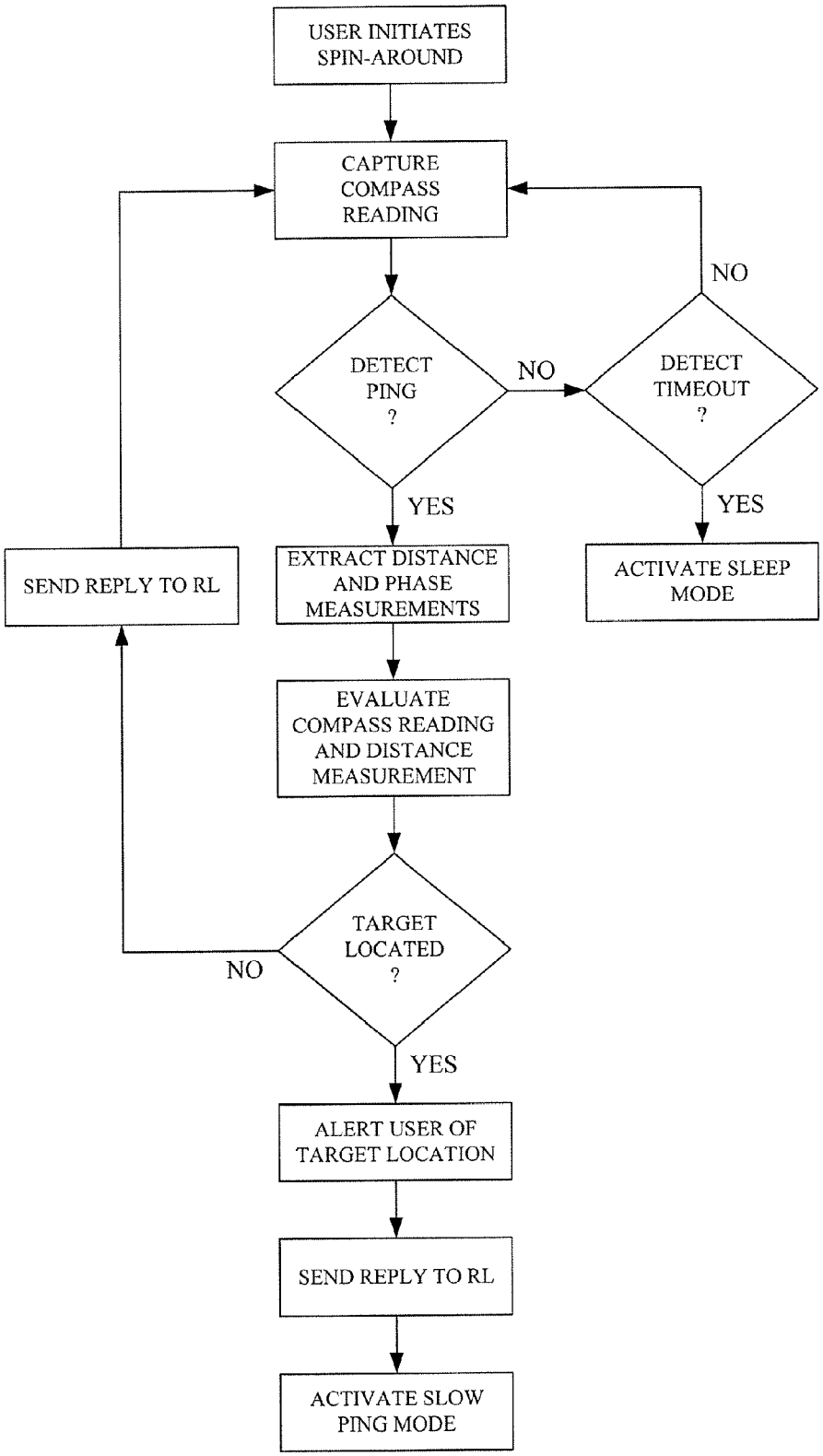
Figure 14C:
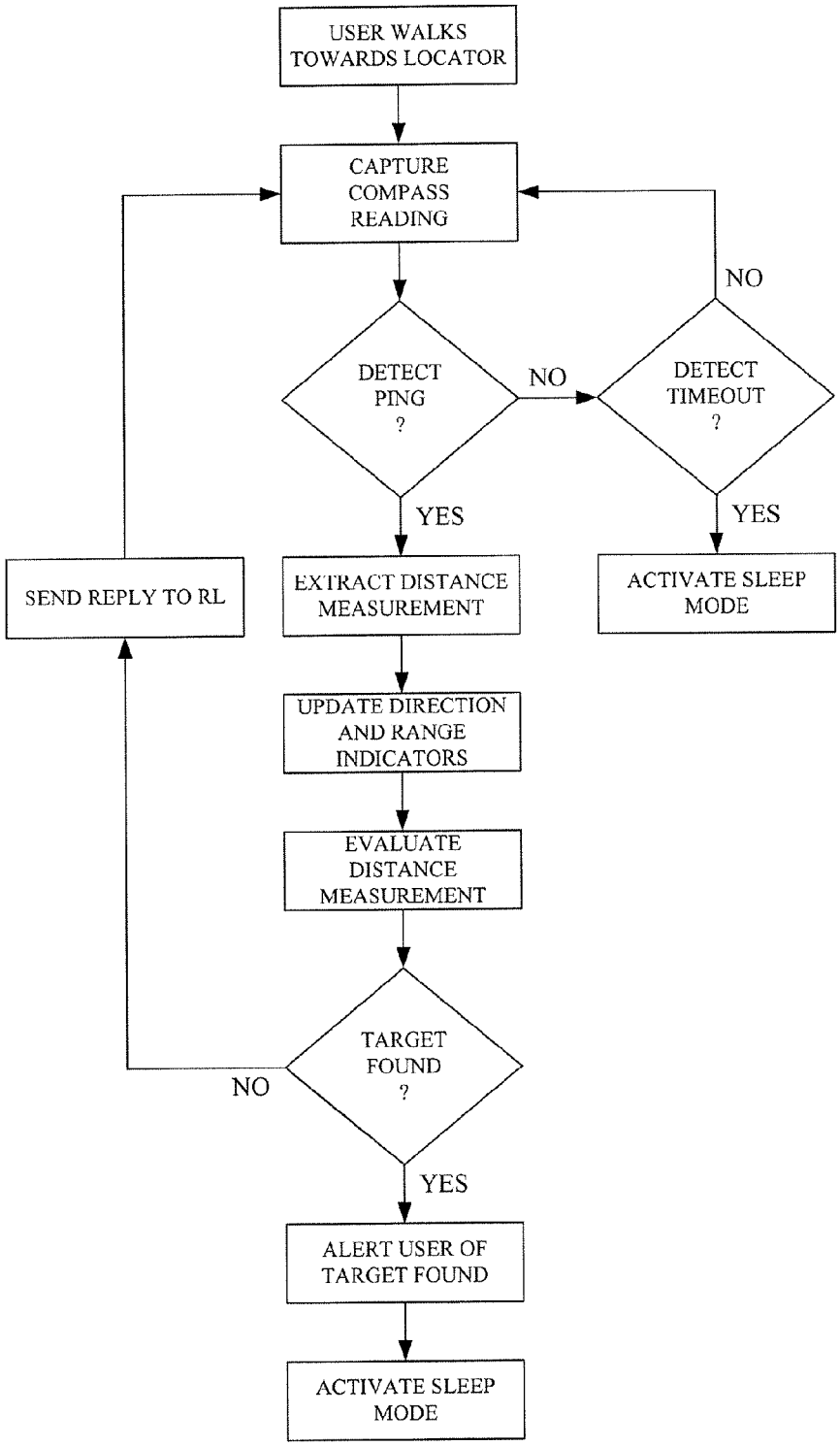

FIGS. 14A-14C are example flow charts for search and locate modes of an example micro-transponder (MT) arranged in accordance with at least one aspect of present disclosure.

As shown in FIG. 14A, the transponder (MT) is initially inactive. The user initiates a wake-up such as by pressing a button on the MT and a slow ping mode is activated in the MT device such as described previously. When the transponder and the remote locator have been in communications recently, then the transponder will have a coarse and fine timing that is sufficiently accurate so that communication can be commenced. However, in some instance where the coarse and fine timing of the MT and the RL no longer match relative to one another (e.g. the MT is out of range from the RL), communications are not immediately possible. When a ping is not detected after activation, the MT initiates a search for a communication signal from the RL. During the search, the transponder captures samples over a predetermined time interval that is sufficiently long so that an expected transmission from the RL can be correlated. Thus, during the search, the RL and the MT communicate with one another sufficient to establish coarse and fine timing in the MT for further communications. When the ping has not *been* detected from the RL over a timeout period, the MT activates a sleep mode since the RL is likely out of range.

When a ping is detected from the RL, the MT transmits a reply to the RL and evaluates any coded messages or commands that are communicated in the ping, and extracts any distance information that is encoded in the messages. The MT alerts the user that communication has been established and updates the display as distance measurements are identified. User inputs are evaluated to determine if [he] *the* user desires to change to the locate mode. When the locate mode is activated, the MT sends a reply message to the RL to change to locate mode and the MT activates the fast ping mode. Otherwise, the slow ping mode continues and the MT sends a reply to the RL acknowledging that communication is active.

Locate mode is described with reference to FIG. 14B. During the locate mode, the user initiates a spin around procedure such as that previously described, and the RL [transmit] *transmits* pings at a more frequent interval such as illustrated by time interval T2 in FIG. 12A. Compass readings are captured by the MT while the MT is "listening" for pings from the RL. When pings are not detected by the MT for a timeout interval, the MT activates a sleep mode since the RL is likely out of range. When pings are detected by the MT, distance and phase measurements are extracted from the transmission. The MT then evaluates the distance measurements and compass readings to determine if the target has been located. When the target has not been located, the MT sends a reply message to the RL acknowledging receipt of the distance information. When the target has been located the user is alerted that the target is located. A reply message is then transmitted to the RL and the slow ping mode is activated. Processing continues in FIG. 14C.

As shown in FIG. 14C, the user can begin walking towards the RL after the target location is identified. The RL transmits a slow ping, where each subsequent ping is spaced apart in time such as is illustrated by time interval T1 in FIG. 12A. Compass readings are captured and the distance measurements and current direction indicators are updated each time a ping is received from the RL. The MT continues to transmit replies to the RL for each received ping, acknowledging receipt and continually synchronizing their time bases. The desired direction to locate the MT is also indicated on the MT so that the user can monitor if they are walking in the proper direction or not. Once the MT is within a prescribed range such as 10 feet, for example, the MT provides an alert indication (e.g., a sound, a flashing light, a vibrating alert, etc.) that the target has been found and the MT goes to a sleep mode. A timeout detection and sleep mode activation can be employed for cases where the MT loses communication with the RL once the slow ping mode is enabled.

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

What is claimed is:

1. A remote locator device that is tagged to an object, wherein the remote locator device is arranged to communicate with a portable transponder device that is operated by a user such that the user can determine [a relative direction and] *at least a* distance to the object from the portable transponder device, the remote locator device comprising:

a time control circuit that is arranged to provide timing control signals according to an internal clock of the remote locator device;

a transmitter means that is arranged to transmit a structured multi-frame transmission to the portable transponder device when activated such that the structured multi-frame transmission has a transmit cadence and frequency that is determined by the internal clock of the remote locator device, wherein the structured multi-frame transmission is coded with an identifier recognized by the portable transponder device;

a receiver means that is arranged to capture samples when activated with an array of capture buffers;

a circular correlator that is arranged to identify a correlation and a correlation phase in response to captured samples from the receiver means;

a processor means that is arranged in cooperation with the time control circuit, the transmitter means, the receiver means and the circular correlator, wherein the processor means is arranged to initialize the remote locator device in a slow ping mode, wherein in the slow ping mode the processor means is arranged for:

initiating the transmission of a first structured multi-frame transmission to the portable transponder device at a first time;

capturing samples with the array of capture buffers and the receiver means over a first predetermined time interval that is sufficient to accumulate values for multiple transmissions of a first sequence from the portable transponder device;

detecting a first reply from the portable transponder device at a second time when the captured samples in the array of capture buffers correlates with an expected first reply transmission for the first sequence from the portable transponder device;

calculating a distance between the remote locator device and the portable transponder device based on a difference between the second time and the first time;

encoding the calculated distance between the remote locator device and the portable transponder device in a second structured multi-frame transmission; and initiating the transmission of the second structured multi-frame transmission to the portable transponder device at a third time such that the portable transponder device can extract the encoded calculated distance from the second structured multi-frame transmission upon receipt.

2. The remote locator device of claim 1, wherein in the slow ping mode the processor means is further arranged for:

capturing samples with the array of capture buffers and the receiver means over a second predetermined time interval that is sufficient to accumulate values for multiple transmissions of a second sequence from the portable transponder device;

detecting a second reply from the portable transponder device at a fourth time when the captured samples in the array of capture buffers correlates with an expected second reply transmission for the second sequence from the portable transponder device;

identifying a message to change to a fast ping mode from second reply from the portable transponder device; and initiating a change to the fast ping mode in response to the identified message.

3. The remote locator device of claim 2, wherein in the fast ping mode the processor means is arranged for repeatedly:

capturing samples with the array of capture buffers and the receiver means over a third predetermined time interval that is sufficient to accumulate values for multiple transmissions of a third sequence from the portable transponder device;

detecting a third reply from the portable transponder device at a fifth time when the captured samples in the array of capture buffers correlates to an expected third reply transmission for the third sequence from the portable transponder device;

calculating a second distance between the remote locator device and the portable transponder device based on a difference between the second time and the first time;

encoding the calculated second distance between the remote locator device and the portable transponder device in a third structured multi-frame transmissions; and

[initiate] *initiating* the transmission of the third structured multi-frame transmission to the portable transponder device at a sixth time such that the portable transponder device can extract the encoded calculated distance from the third structured multi-frame [transmissions] *transmission* upon receipt.

4. The remote locator device of claim 3, wherein in the fast ping mode the processor means is further arranged for:

extracting compass measurements from the portable transponder device that is encoded in each third reply;

pairing each compass measurement with an associated calculated distance;

determining the relative direction of the remote locator device from the portable transponder device from at least the compass measurements and the calculated distances;

encoding the relative direction in a fourth structured multi-frame transmission; and initiating the transmission of the fourth structured multi-frame transmission to the portable transponder device at a seventh time such that the portable transponder can extract the relative direction from the fourth structured multi-frame transmission upon receipt.

5. The remote locator device of claim 3, further comprising:

a first antenna located in a first region of the remote locator device;

a second antenna [that is] located in a second region of the remote locator device;

*wherein the receiver means comprises* a first receiver means [configuration with] *coupled to* the first antenna[; ], and *a second receiver means coupled to the second antenna*

[a second receiver means configuration with the second antenna,] wherein in the fast ping mode the processor means is further arranged for:

evaluating captured samples associated with the first receiver [configuration] and the second receiver [configuration]; [and]

determining the relative direction of the remote locator device from the portable transponder device based on the evaluated captured samples from the first receiver [configuration] and the second receiver [configuration];

encoding the relative direction in a fourth structured multi-frame transmission; and initiating the transmission of the fourth structured multi-frame transmission to the portable transponder device at a seventh time such that the portable transponder can extract the relative direction from the fourth structured multi-frame [transmissions] *transmission* upon receipt.

6. The remote locator device of claim 3, wherein in the fast ping mode the processor means [if] *is* further arranged for: identifying correlator phase information associated with detected replies, and encoding correlator phase information in the third structured multi-frame transmission for receipt by the portable transponder device.

7. The remote locator device of claim 2, wherein the fast ping mode is terminated and the slow ping mode activated when the processor determines that a timeout condition is satisfied without detecting replies from the portable transponder device.

8. The remote locator device of claim 1, wherein the processor means comprises at least one of: a micro-processor, a micro-controller, a complex instruction set computer (CISC) processor, a reduced instruction set computer (RISC) processor, an application specific integrated circuit (ASIC), a programmable logic device (PLD), a mode control logic, a firmware, a software, a storage circuit, a memory circuit, a non-volatile memory (NVM), and a read-only memory (ROM).

9. The remote locator device of claim 1, wherein the receiver means is arranged to accumulate captured signals to form an integrated captured sequence as the captured samples such that the circular correlator can identify the correlation when the captured samples from the integrated captured sequence correlates with a structured reply transmission from the portable transponder device.

10. A portable transponder device that is operated by a user and arranged to communicate with a remote locator device that is tagged to an object such that the user can determine *at least* a [relative direction and] distance to the object from the portable transponder device, the portable transponder device comprising:

an input device that is arranged to accept user initiated input;

a time control circuit that is arranged to provide timing control signals from a high speed internal clock, wherein the time control circuit is arranged to deactivate the high speed internal clock when the portable transponder device is in a low power sleep mode, and enable the high speed internal clock when a wake-up is initiated;

an indication means that is arranged to report information to the user;

a transmitter means that is arranged to transmit a structured multi-frame reply transmission to the remote locator device when activated such that the structured multi-frame transmission has a transmit cadence and frequency that is determined by the internal clock and the structured multi-frame transmission is coded with an identifier recognized as from the portable transponder device;

a receiver means that is arranged to capture samples when activated;

a correlator that is arranged to identify a correlation and a correlation phase in response to captured samples from the receiver means;

a processor means that is arranged in cooperation with the input device, the time control circuit, the indication means, the transmitter means, the receiver means and the correlator, wherein the processor means is arranged for:

initializing the portable transponder device in a low power sleep mode;

detecting user initiated inputs;

activating a slow ping mode when the user initiates a wake-up, wherein in the slow ping mode the processor is arranged for:

capturing samples with the receiver means over a first predetermined time interval sufficient to capture a first expected transmission of a first sequence from the remote locator device;

detecting a first ping from the remote locator device at a first time when the captured samples correlate with the expected first transmission from the remote locator device;

initiating the transmission of a first structured multi-frame reply transmission to the remote locator device at a second time, capturing samples with the receiver means over a second predetermined time interval sufficient to capture a second expected transmission of a second sequence from the remote locator device;

detecting a second ping from the remote locator device at a third time when the captured samples from the second predetermined time interval correlate to the second expected transmission from the remote locator device; and extracting the distance to the object from the detected second ping.

11. The portable transponder device of claim 10, wherein in the slow ping mode the processor means is further arranged for:

encoding a first message to the remote locator device in a second structured multi-frame reply transmission, wherein the message includes a request to change to a fast ping mode; and initiating the transmission of the second structured multi-frame reply transmission in response to user initiated input at a fourth time.

12. The portable transponder device of claim 11, wherein in the fast ping mode the processor means is arranged for repeatedly:

capturing samples with the receiver means over a third predetermined time interval sufficient to capture a third expected transmission of a third sequence from the remote locator device;

detecting a third ping from the remote locator device at a fourth time when the captured samples correlate to the third expected transmission from the remote locator device; and extracting the distance to the object from each detected third ping.

13. The portable transponder device of claim 12, wherein in the fast ping mode the processor means is arranged for repeatedly:

monitoring a rotational position of the portable transponder device for each detected third ping;

initiating the transmission of a third structured multi-frame reply transmission to the remote locator device at a fifth time; and determining the relative distance and direction to the object.

14. The portable transponder device of claim 12, wherein in the fast ping mode the processor means is arranged for repeatedly:

capturing samples with the receiver means over a fourth predetermined time interval sufficient to capture a fourth expected transmission of a fourth sequence from the remote locator device;

detecting a fourth ping from the remote locator device at a fifth time when the captured samples correlate to the fourth expected transmission from the remote locator device; and extracting the relative direction of the object from the detected fourth ping.

15. The portable transponder device of claim 10, further comprising a means for determining a rotational position associated with the portable transponder device about an axis that is approximately centered about the user of the portable transponder device.

16. The portable transponder device of claim 15 wherein the means for determining the rotational position comprises at least one of: an analog compass sensor device, a digital compass sensor device, and an analog-to-digital converter that is arranged to work with the analog compass sensor device.

17. The portable transponder device of claim 12, wherein in the fast ping mode the processor means is further arranged for: extracting correlator phase information associated with the remote locator from the detected third ping, and utilizing the correlator phase information to synthesize [the] *a* high frequency clock for the transmitter means.

18. The portable transponder device of claim [12] *13*, wherein the fast ping mode is terminated and the slow ping mode is initiated after the relative distance and direction to the object is determined.

19. The portable transponder device of claim 10, wherein the processor means comprises at least one of: a micro-processor, a micro-controller, a complex instruction set computer (CISC) processor, a reduced instruction set computer (RISC) processor, an application specific integrated circuit (ASIC), a programmable logic device (PLD), a mode control logic, a firmware, a software, a storage circuit, a memory circuit, a non-volatile memory (NVM), and a read-only memory (ROM).

20. The portable transponder device of claim 10, wherein the processor means is further arranged to initiate a user notification via the indication means when the direction associated with the location of the remote locator relative to the portable transponder device is determined.

21. The portable transponder device of claim 10, wherein the indication means is arranged to provide a visual indicator of the determined direction.

22. The portable transponder device of claim 10, wherein the visual indicator comprises at least one of: a graphical distance indication, an alphanumeric distance indication, a graphical direction indication, and an alphanumeric direction indication.

23. The portable transponder device of claim 10, the input device comprising an interrupt signal, a wake-up timer, a keyboard device, a keypad device, a button, a key, a touch-screen, a touch-panel, a joystick device, a joy-pad device, a mouse device, a pointing device, a touch-pad device, a pressure sensitive input device, another processor, or an input generated by a software program.

24. The portable transponder device of claim 10, the input device comprising an audio input processor that is arranged to process sound as the user input.

25. The portable transponder device of claim 24, the audio input processor comprising either an analog to digital-converter (ADC) circuit or a coder-decoder (CODEC) circuit.

26. The portable transponder device of claim 24, the audio input processor comprising a voice input means.

27. The portable transponder device of claim 10, the indication means comprising an audio output circuit that is configured to provide an audible alert to the user, wherein the audio output circuit includes an audio output processor that is combined in function with the audio input processor.

28. The portable transponder device of claim 10, the indication means comprising an audio output circuit that is configured to provide audible information to the user.

29. The portable transponder device of claim 28, wherein the audio output circuit comprises either: an audio output device, an audio output processor, or a combination of the audio output device and the audio output processor.

30. The portable transponder device of claim 28, wherein the audio output circuit comprises either a speaker device, a piezo device, or an audio output port that is accessible by the user.

31. The portable transponder device of claim 28, wherein the audio output circuit comprising either an analog to digital-converter (ADC) circuit or a coder-decoder (CODEC) circuit.

32. The portable transponder device of claim 28, the audio output circuit is arranged to playback sounds from either a previously recorded sound or a user recorded sound.

33. The portable transponder device of claim 28, wherein the audio output circuit is arranged to synthesize previously selected sounds.

34. The portable transponder device of claim 10, the indication means comprising a visual output circuit that is configured to provide visual information to the user.

35. The portable transponder device of claim 34, wherein the visual information comprises at least one of: a graphical distance indication, an alphanumeric distance indication, a graphical direction indication, and an alphanumeric direction indication.

36. The portable transponder device of claim 34, the visual output circuit comprising at least one of: an LED type display, an LCD type display, an active display, a passive display, a black and white display, a monochromatic display, a color display, a discrete arrangement of LEDs, a seven segment display, and a light emitting device.

37. The portable transponder device of claim 34, wherein the visual output circuit and the input device are combined in a touch screen device.

38. The portable transponder device of claim 10, wherein the processor means is further arranged for determining an elapsed time since the last successful communication and computing an approximation of a time uncertainty associated with the portable transponder device based on the elapsed time.

39. The portable transponder device of claim 38, wherein the portable transponder device is arranged to re-establish communications with the remote locator device by evaluating the approximation of the time uncertainty associated with the portable transponder device and scanning the relevant time range such that communication are re-established with minimal impact on power consumption.

* * * * *